(12) United States Patent
Jammalamadaka et al.

(10) Patent No.: US 11,551,156 B2
(45) Date of Patent: Jan. 10, 2023

(54) SYSTEMS AND METHODS FOR FORECAST ALERTS WITH PROGRAMMABLE HUMAN-MACHINE HYBRID ENSEMBLE LEARNING

(71) Applicant: HRL LABORATORIES, LLC, Malibu, CA (US)

(72) Inventors: Aruna Jammalamadaka, Agoura Hills, CA (US); David J. Huber, Calabasas, CA (US); Samuel D. Johnson, Malibu, CA (US); Tsai-Ching Lu, Thousand Oaks, CA (US)

(73) Assignee: HRL LABORATORIES, LLC., Malibu, CA (US)

( * ) Notice: Subject to any disclaimer, the term of this patent is extended or adjusted under 35 U.S.C. 154(b) by 502 days.

(21) Appl. No.: 16/714,068

(22) Filed: Dec. 13, 2019

(65) Prior Publication Data
US 2020/0311615 A1 Oct. 1, 2020

Related U.S. Application Data

(60) Provisional application No. 62/824,150, filed on Mar. 26, 2019.

(51) Int. Cl.
*G06N 3/02* (2006.01)
*G06N 3/08* (2006.01)
(Continued)

(52) U.S. Cl.
CPC ........... *G06N 20/20* (2019.01); *G06F 40/205* (2020.01); *G06K 9/6267* (2013.01); *G06N 7/005* (2013.01)

(58) Field of Classification Search
USPC ............ 382/155–159; 704/1–275; 706/6–45, 706/61–62
See application file for complete search history.

(56) References Cited

U.S. PATENT DOCUMENTS 8,935,198 B1 * 1/2015 Phillips .................. G06Q 40/00
706/62
10,984,367 B2 * 4/2021 Achin .................... G06F 9/5011
(Continued)

OTHER PUBLICATIONS

International Search Report and Written Opinion of the International Searching Authority dated Apr. 6, 2020 issued in corresponding PCT Application No. PCT/US2019/066313, 13 pages.
(Continued)

*Primary Examiner* — Marcellus J Augustin
(74) *Attorney, Agent, or Firm* — Lewis Roca Rothgerber Christie LLP

(57) ABSTRACT

A method for computing a human-machine hybrid ensemble prediction includes: receiving an individual forecasting question (IFP); classifying the IFP into one of a plurality of canonical question topics; identifying machine models associated with the canonical question topic; for each of the machine models: receiving, from one of a plurality of human participants: a first task input including a selection of sets of training data; a second task input including selections of portions of the selected sets of training data; and a third task input including model parameters to configure the machine model; training the machine model in accordance with the first, second, and third task inputs; and computing a machine model forecast based on the trained machine model; computing an aggregated forecast from machine model forecasts computed by the machine models; and sending an alert in response to determining that the aggregated forecast satisfies a threshold condition.

30 Claims, 12 Drawing Sheets

(51) Int. Cl.
  *G06N 20/00* (2019.01)
  *G06F 40/20* (2020.01)
  *G06N 20/20* (2019.01)
  *G06F 40/205* (2020.01)
  *G06K 9/62* (2022.01)
  *G06N 7/00* (2006.01)

(56) References Cited

U.S. PATENT DOCUMENTS

| | | | |
|---|---|---|---|
| 11,030,554 B2* | 6/2021 | Polli | G09B 7/02 |
| 2009/0204436 A1* | 8/2009 | Thorne | G16H 10/60 |
| | | | 705/7.42 |
| 2010/0241596 A1 | 9/2010 | Lee et al. | |
| 2017/0076023 A1* | 3/2017 | Cormier | G06N 20/00 |
| 2019/0066133 A1* | 2/2019 | Cotton | G06F 17/11 |
| 2019/0212908 A1* | 7/2019 | Willcox | H04L 67/12 |
| 2020/0219020 A1* | 7/2020 | Giaquinto | G06N 7/005 |
| 2020/0257943 A1* | 8/2020 | Huber | G06N 3/084 |

OTHER PUBLICATIONS

Aggarwal, Sanchit, "SquadAI: Crowd Driven Platform for Building, Managing and Evaluating Machine Learning Workflows", Jul. 17, 2018, XP055679491, retrieved from the Internet: URL:https://towardsdatascience.com/squadai-crowdsourced-driven-platform-for-building-managing-and-evaluating-machine-learning-ca5d28ac9b23, retrieved by the ISA on Mar. 25, 2020, entire document, 8 pages.

* cited by examiner

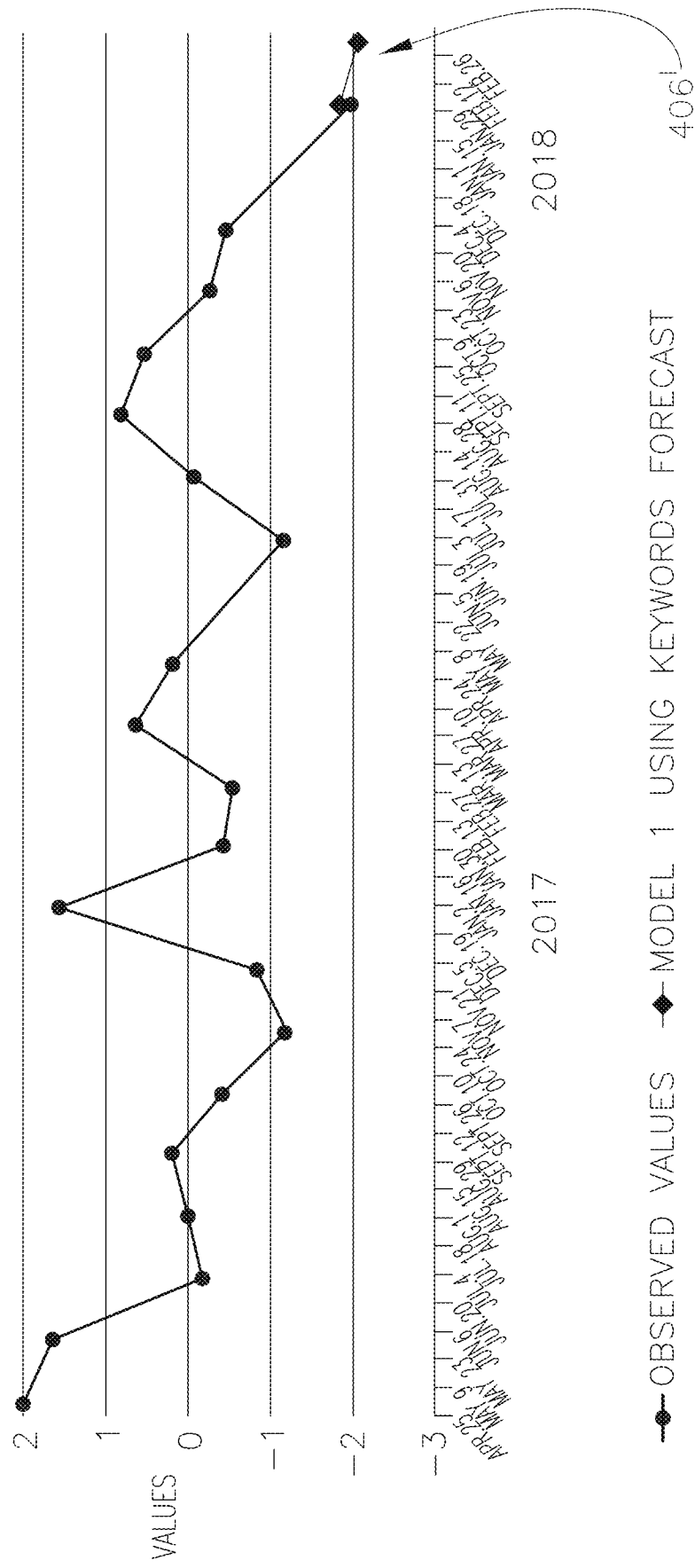

SYSTEMS AND METHODS FOR FORECAST ALERTS WITH PROGRAMMABLE HUMAN-MACHINE HYBRID ENSEMBLE LEARNING

CROSS-REFERENCE TO RELATED APPLICATION(S)

This application claims the benefit of U.S. Provisional Patent Application No. 62/824,150 "A Forecast Alert System with Programmable Human-Machine Hybrid Ensemble Learning Methods," filed in the United States Patent and Trademark Office on Mar. 26, 2019, the entire disclosure of which is incorporated by reference herein.

STATEMENT REGARDING FEDERALLY SPONSORED RESEARCH OR DEVELOPMENT

The present invention was made with support from the United States Government under contract no. 2017-17061500006 issued by the Intelligence Advanced Research Projects Activity. The United States Government has certain rights in this invention.

FIELD

Aspects of embodiments of the present invention relate to human-machine hybrid prediction systems and methods for predicting events using hybrids of human predictors and machine predictors, and user interfaces therefor.

BACKGROUND

Predicting the timing or outcomes of future events is a common occurrence. For example: meteorologists predict the weather in various localities based on measurements of current conditions; sports analysts predict the outcomes of tournaments based on their assessments of the various teams; and political analysts predict the outcomes of elections based on polling data and the behavior of the candidates.

Predictions are often performed using various computer and/or mathematical models in machine-based forecasting systems. However, machine forecasting systems also exhibit what is called the "cold-start problem," in which the accuracy of the system is extremely limited or reduced when a new problem is introduced and remains low until the system has accumulated enough data to understand the problem. This contributes to the rigidity of machine-only forecasting systems by slowing down the rate at which the system can adapt to new problems and topic areas.

SUMMARY

Aspects of embodiments of the present invention relate to systems and methods for programmable human-machine hybrid ensemble learning.

According to one embodiment of the present invention, a method for computing a human-machine hybrid ensemble prediction includes: receiving, by a computer system including a processor and memory, an individual forecasting question; parsing, by the computer system, the individual forecasting question to classify the individual forecasting question into a canonical question topic from among a plurality of canonical question topics; identifying, by the computer system, one or more machine models associated with the canonical question topic; for each of the machine models: receiving, from a human participant of a plurality of human participants: a first task input including a selection of one or more sets of training data; a second task input including one or more selections of portions of the selected sets of training data for training the machine model; and a third task input including a collection of model parameters to configure the machine model; training the machine model in accordance with the first task input, the second task input, and the third task input; and computing a machine model forecast based on the trained machine model; computing, by the computer system, an aggregated forecast from a plurality of machine model forecasts computed by the one or more machine models in accordance with a plurality of weights associated with the human participants; and sending, by the computer system, an alert in response to determining that the aggregated forecast satisfies the threshold condition.

The method may further include: displaying the machine model forecast to the human participant; re-computing the machine model forecast in response to: the selection of the one or more sets of training data of the first task input; the selection of the one or more portions of the selected sets of training data of the second task input; or the collection of model parameters of the third task input; and updating the machine model forecast displayed to the human participant in accordance with the re-computed machine model forecast.

The first task input may include the selection of a data set from a plurality of sets of training data stored in the memory of the computer system.

The first task input may include uploading a data set to the memory of the computer system from a source unknown to the computer system.

The second task input may include the selection of a training window including data points from a start date until an end date.

The second task input may include a selection of outlier data points for removal.

The one or more machine models may include a Bayesian Structural Time-Series model.

Each of the human participants may be associated with: a first weight representing credibility of the human participant on the first task input; a second weight representing credibility of the human participant on the second task input; and a third weight representing credibility of the human participant on the third task input.

The method may further include updating the weights associated with the human participants by: detecting resolution of the individual forecasting question as a ground truth; retrieving the machine model forecasts computed based on the trained machine models trained in accordance with the first task input, the second task input, and the third task input from the human participants; and for each human participant of the human participants: computing an error between the ground truth and the machine model forecast associated with the human participant; in response to determining that the error is small, increasing one or more weights associated with the human participant; and in response to determining that the error is large, decreasing one or more weights associated with the human participant.

The method may further include updating the weights associated with the human participants in accordance with a multiplicative weights algorithm.

According to one embodiment of the present invention, a hybrid ensemble learning system for computing a human-machine ensemble prediction includes: a processor; and memory storing instructions that, when executed by the processor, cause the processor to: receive an individual forecasting question; parse the individual forecasting question to classify the individual forecasting question into a canonical question topic from among a plurality of canonical question topics; identify one or more machine models associated with the canonical question topic; for each of the machine models: receive, from a human participant of a plurality of human participants: a first task input including a selection of one or more sets of training data; a second task input including one or more selections of portions of the selected sets of training data for training the machine model; and a third task input including a collection of model parameters to configure the machine model; train the machine model in accordance with the first task input, the second task input, and the third task input; and compute a machine model forecast based on the trained machine model; compute an aggregated forecast from a plurality of machine model forecasts computed by the one or more machine models in accordance with a plurality of weights associated with the human participants; and send an alert in response to determining that the aggregated forecast satisfies the threshold condition.

The memory may further store instructions that, when executed by the processor, cause the processor to: display the machine model forecast to the human participant; re-compute the machine model forecast in response to: the selection of the one or more sets of training data of the first task input; the selection of the one or more portions of the selected sets of training data of the second task input; or the collection of model parameters of the third task input; and update the machine model forecast displayed to the human participant in accordance with the re-computed machine model forecast.

The first task input may include the selection of a data set from a plurality of sets of training data stored in the memory of the hybrid ensemble learning system.

The first task input may include uploading a data set to the memory of the hybrid ensemble learning system from a source unknown to the hybrid ensemble learning system.

The second task input may include the selection of a training window including data points from a start date until an end date.

The second task input may include a selection of outlier data points for removal.

The one or more machine models may include a Bayesian Structural Time-Series model.

Each of the human participants may be associated with: a first weight representing credibility of the human participant on the first task input; a second weight representing credibility of the human participant on the second task input; and a third weight representing credibility of the human participant on the third task input.

The memory may further store instructions that, when executed by the processor, cause the processor to update the weights associated with the human participants by: detecting a resolution of the individual forecasting question as a ground truth; retrieving the machine model forecasts computed based on the trained machine models trained in accordance with the first task input, the second task input, and the third task input from the human participants; and for each human participant of the human participants: computing an error between the ground truth and the machine model forecast associated with the human participant; in response to determining that the error is small, increasing one or more weights associated with the human participant; and in response to determining that the error is large, decreasing one or more weights associated with the human participant.

The memory may further store instructions that, when executed by the processor, cause the processor to update the weights associated with the human participants in accordance with a multiplicative weights algorithm.

According to one embodiment of the present invention, a non-transitory computer readable medium has instructions stored thereon that, when executed by a computer system including a processor and memory, configure the computer system to: receive an individual forecasting question; parse the individual forecasting question to classify the individual forecasting question into a canonical question topic from among a plurality of canonical question topics; identify one or more machine models associated with the canonical question topic; for each of the machine models: receive, from a human participant of a plurality of human participants: a first task input including a selection of one or more sets of training data; a second task input including one or more selections of portions of the selected sets of training data for training the machine model; and a third task input including a collection of model parameters to configure the machine model; train the machine model in accordance with the first task input, the second task input, and the third task input; and compute a machine model forecast based on the trained machine model; compute an aggregated forecast from a plurality of machine model forecasts computed by the one or more machine models in accordance with a plurality of weights associated with the human participants; and send an alert in response to determining that the aggregated forecast satisfies the threshold condition.

The non-transitory computer readable medium may further store instructions that, when executed by the computer system, configure the computer system to: display the machine model forecast to the human participant; re-compute the machine model forecast in response to: the selection of the one or more sets of training data of the first task input; the selection of the one or more portions of the selected sets of training data of the second task input; or the collection of model parameters of the third task input; and update the machine model forecast displayed to the human participant in accordance with the re-computed machine model forecast.

The first task input may include the selection of a data set from a plurality of sets of training data stored in the memory of the computer system.

The first task input may include uploading a data set to the memory of the computer system from a source unknown to the computer system.

The second task input may include the selection of a training window including data points from a start date until an end date.

The second task input may include a selection of outlier data points for removal.

The one or more machine models may include a Bayesian Structural Time-Series model.

Each of the human participants may be associated with: a first weight representing credibility of the human participant on the first task input; a second weight representing credibility of the human participant on the second task input; and a third weight representing credibility of the human participant on the third task input.

The non-transitory computer readable medium may further store instructions that, when executed by the computer system, cause the computer system to update the weights associated with the human participants by: detecting resolution of the individual forecasting question as a ground truth; retrieving the machine model forecasts computed based on the trained machine models trained in accordance with the first task input, the second task input, and the third task input from the human participants; and for each human participant of the human participants: computing an error between the ground truth and the machine model forecast associated with the human participant; in response to determining that the error is small, increasing one or more weights associated with the human participant; and in response to determining that the error is large, decreasing one or more weights associated with the human participant.

The non-transitory computer readable medium may further store instructions that, when executed by the computer system, cause the computer system to update the weights associated with the human participants in accordance with a multiplicative weights algorithm.

BRIEF DESCRIPTION OF THE DRAWINGS

The accompanying drawings, together with the specification, illustrate exemplary embodiments of the present invention, and, together with the description, serve to explain the principles of the present invention.

FIG. 4B is a depiction of a user interface according to one embodiment of the present invention depicting time series data with outliers removed.

DETAILED DESCRIPTION

Figure 1A:
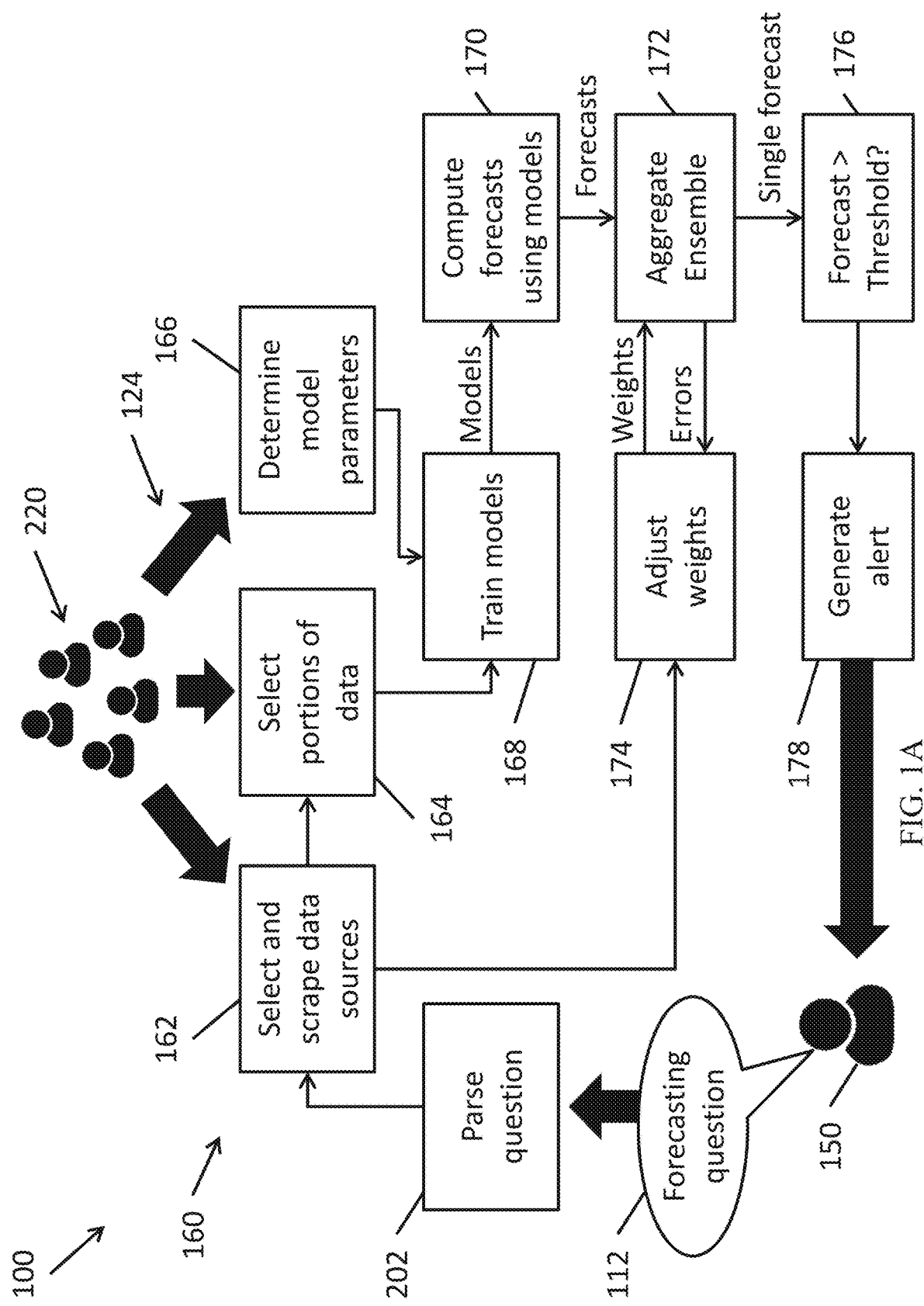
FIG. 1A is a flowchart depicting a method for computing predictions using a hybrid ensemble learning system according to embodiments of the present invention and the interactions of the hybrid ensemble learning system with a user and human participants (human predictors).

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present invention relate to systems and methods for improving the performance of machine forecasting systems based on input from human subject matter experts. Forecasters (or predictors) generally apply statistical techniques to make forecasts or predictions of future events or conditions based on existing data in a variety of different subject matter areas, where examples of predictions include: currency exchange rates in the future; future interest rates; geopolitical events (e.g., the outcomes of elections); weather patterns; natural disasters; casualties in ongoing armed conflicts; and the like. Some aspects of embodiments of the present invention relate to automatically generating alerts (e.g., email alerts, text message alerts, notifications on computing devices, and the like) to parties interested in the predictions made by the forecasting systems when those predictions satisfy some threshold conditions (e.g., a change greater than one standard deviation).

Human and machine forecasters bring different advantages to the forecasting process. For example, human forecasters are generally better at causal inference, which can aid in determining reasons for outliers and appropriateness of data sources, whereas machine forecasters (in the form of statistical models) are generally better at providing unbiased forecasting based on large amounts of data. However, comparative methods for leveraging both human and machine forecasting often incorporate human judgmental adjustments into machine models, which can bias forecasts and harm accuracy.

Comparative methods for forecasting, such as obtaining geopolitical forecasts within the Intelligence Community (IC) community (e.g., government intelligence agencies), involve assembling a team of analysts, only some of whom may have statistical expertise. Intelligence Community (IC) analysts are generally constrained by their ability to multi-task and process large quantities of information in collaboration with other IC and commercial organizations.

Aspects of embodiments of the present invention relate to systems and methods for enabling human-assisted machine learning that reduces machine bias (such as model drift and data drift) and outlier effects. Aspects of embodiments of the present invention also reduce or eliminate the cold start problem by using input from human subject matter experts (SMEs) (for example, intelligence community analysts, economists, and political strategists) to tailor data sets for use by the machine models. Embodiments of the present invention assist subject matter experts in working alongside computer models (e.g., machine learning algorithms) and other human analysts, thereby leveraging the strengths of both human and machine models.

Accordingly, aspects of embodiments of the present invention allow subject matter experts (as opposed to, for example, data scientists or other machine learning experts) to tailor the data sets and to guide the training and behavior of computer-based machine models to make predictions in their areas of expertise. For example, embodiments of the present invention allow experts in geopolitics to assist in the training of computer models for predicting geopolitical events.

In some circumstances, multiple different machine models may potentially be applicable to the problem at hand, where different machine models may have different tradeoffs (e.g., better accuracy in the short term versus long term or better sensitivity to different types of inputs) and may represent different data sources, different views of the data, and different human inputs, which provides a more robust output than would be provided by a single machine model. By combining the outputs of multiple machine learning models, aspects of embodiments of the present invention are able to generate predictions that are robust to noise, drift, and other types of machine bias and overcome the "cold start" problem that plagues machine learning, in which the algorithms themselves must (often slowly) determine which information contains useful signal and which is merely noise (e.g., irrelevant information).

However, it may be difficult to automatically determine which machine models will be best suited for a particular prediction task, or whether a weighted ensemble of machine models may be appropriate and, if so, how the different models should be weighted in computing the result. In embodiments of the present invention involving multiple machine models, the outputs of the individual ensembles are aggregated using weighting mechanisms based on votes from the analysts to generate a single system output, where the weights are based on confidence in the individual analysts in accordance with their individual historical accuracies (e.g., whether the analyst has been correct on these questions in the past).

Therefore, the "programming" of these ensembles is performed by the subject matter experts who use embodiments of the present invention to control the training sets and model parameters, where the system automatically generates new ensembles of models for the prediction of events (e.g., geopolitical quantities of interest) based on this information. In more detail, in order to combat the blind reliance on humans for ground truth input, aspects of embodiments of the present invention relate to systems and methods that leverage an ensemble of machine models, as guided by human forecasters, which enable embodiments of the present invention to improve the accuracy of the machine predictions more quickly than comparative systems that do not use human assistance.

Some aspects of embodiments of the present invention relate to receiving human forecaster input on the process of training and using the machine models, including: (1) identifying and selecting data sources; (2) identifying outlier data points and selecting windows of training data; and (3) setting model parameters. The guidance provided by each human forecaster may then also be weighted, over time, based on the accuracy of the results produced by the models as guided by those users (e.g., when compared to the ground truth outcomes of their predictions). In some embodiments of the present invention, the weights associated with each human forecaster are computed by estimating the marginal improvement obtained from including a particular user's input for a particular task. In some embodiments, this marginal improvement is estimated by using a Brier score computed between the forecast with and without the input and the realized forecast value.

In some embodiments, the final aggregated forecast output is used to control a notification system which alerts an end user (e.g., via email or via cell phone) when the forecast value satisfies (e.g., rises above or below) a pre-specified threshold. The end user (e.g., a decision maker within the intelligence community) may subsequently use the alert to make resource allocations or to make policy changes.

Some embodiments of the present invention are used for time-series forecasting, in which future values may be predicted based, in part, on a series of prior values. For example, a forecast of the closing value of a stock market index on a future date may be computed based on a time series of the closing values of that stock market index on prior dates. Accordingly, in time-series forecasting, feedback on accuracy of forecasts is constantly and consistently being provided by automatically scraping data sources for time-series data. Continuing the above example, the accuracy of a forecasted closing value of the stock market index on a particular date can be compared against the actual closing value of the index once that date arrives. Therefore, some embodiments of the present invention use the accuracy of forecasts made in accordance with parameters set by a given human forecaster as the metric to adjust weights associated with the human forecaster.

Comparative systems generally assume that all human forecasters or participants are experts at assisting machine learning systems. In other words, comparative systems assume that the human forecasters have expertise and skills in machine learning, data science, and statistics, or the like. However, in practice, it is generally difficult to find individuals who have sufficient skills both in statistics and the problem domain of the forecasts.

Some comparative systems also use predictions from human predictors directly for generating predictions by aggregating the separate predictions from the human predictors (e.g., crowd forecasting systems). In contrast, embodiments of the present invention relate to receiving feedback from human predictors for the process of training and configuring the machine learning models.

Applications of Embodiments of the Present Invention

Aspects of embodiments of the present invention are applicable to improving the quality of making predictions in circumstances that, in comparative systems, might be handled by machine learning algorithms (with possible checking by a subject matter expert), such as diagnostics and prognostics, sales and advertising, or projecting user demand. In these applications, in comparative systems, machine learning is used to generate a model that is configured to compute a forecast or prediction about some type of event (e.g., remaining useful life of a part, prognosis of an impending breakdown, sales projections for a given quarter, and the like), but the machine learning algorithms in these comparative systems are typically generalized across a wide range of potential applications, as opposed to specialized algorithms for particular types of predictions.

In contrast, by incorporating human inputs at every stage of computation in the machine learning pipeline (e.g., training data, algorithm parameters, ensemble aggregation, etc.), hybrid human-machine learning systems according to some embodiments of the present invention are tailored to specific tasks very quickly (e.g., different vehicle models or model years from a baseline model, different aircraft models, etc.). In more detail, embodiments of the present invention enable the distribution of tasks across different experts such as subject matter experts, engineers, technicians, and mechanics who may not have specialized skills in statistics, data management, or other skills specific to training statistical models (e.g., skills in machine learning). Embodiments of the present invention also receive inputs from human participants identifying points of failure in the machine learning pipeline and providing mitigations and work-arounds, such as adjusting the parameters, excluding misleading portions of the data, adding new data sources, adding new machine learning models, removing or reducing the weight of specific algorithms from the ensemble, etc. The output alert from the system may serve as a warning leading to logistics decisions such as specific part recalls, re-ordering of inventory, or serving of advertisements to a particular market.

As additional examples, embodiments of the present invention may be applied in circumstances such as forecasting weather, elections, and product demand (for manufacturing purposes or pricing). For example, if a new toy is going to be released (e.g., the "NES Classic", which was infamously under-produced due to inaccurate models of customer demand), a manufacturer may use the sales of similar toys as a baseline for production. However, this may be insufficient to cover the demand of a toy for the holiday season, and it may be possible to predict an increased demand by monitoring buzz in the public forum. In such circumstances, embodiments of the present invention address these and similar issues by providing opportunity for additional subject matter expert input to the machine models. For example, human input from groups of parents may be used to adjust the data sets or additional models may be added, such as social media activity around the item (e.g., the prevalence of hashtags associated with the item). This additional information from the human subject matter experts may be built into new models that are added to the baseline ensemble and the result would be a new ensemble of models that is specialized to the specific product of interest. This model can then be reused for other similar applications (e.g., the launch of the "Super Nintendo Classic," whose launch went better than its predecessor) and further tuned based on additional variables (e.g., economic conditions, time of year, etc.).

Hybrid Ensemble Learning System Overview

Figure 8:
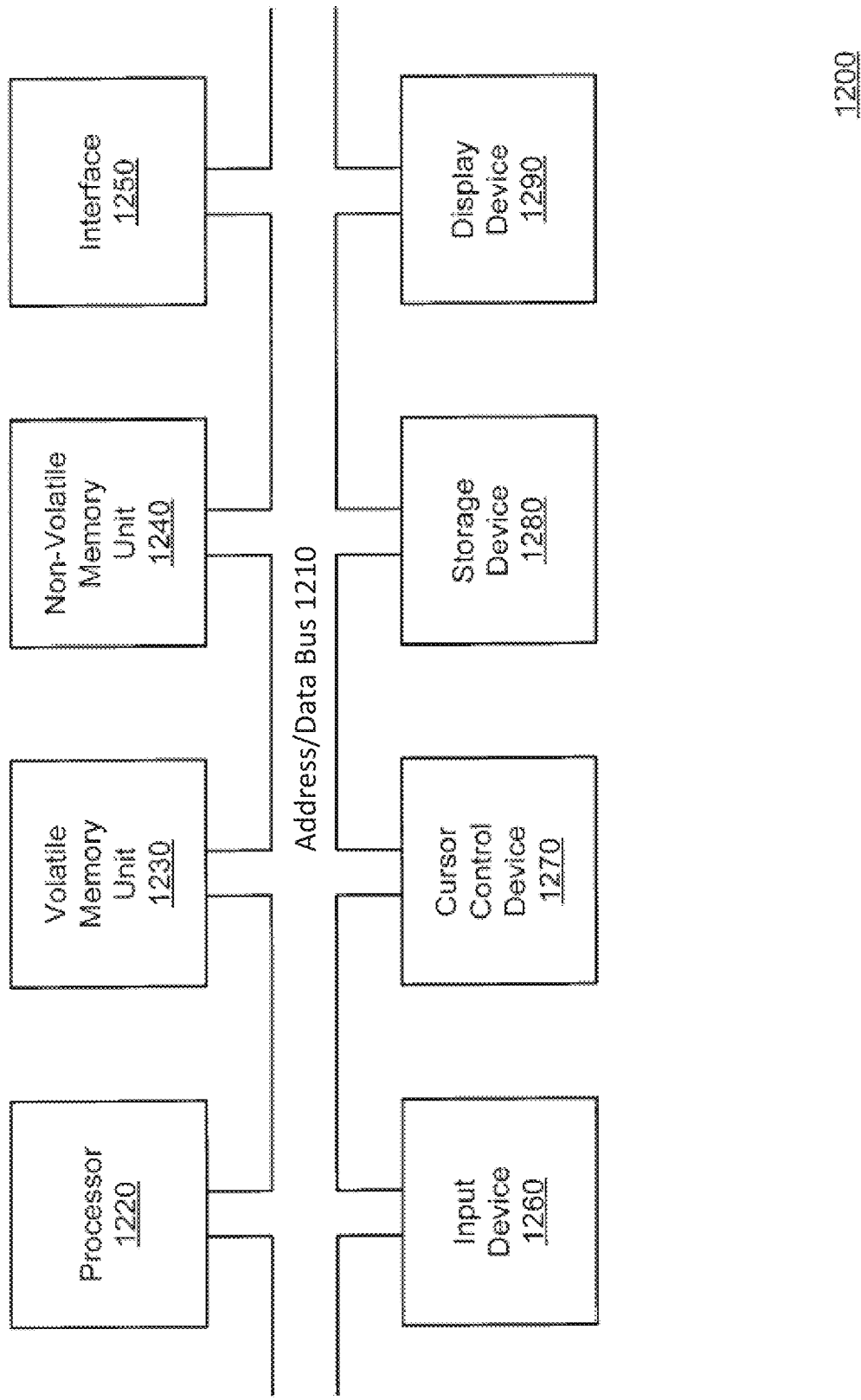
FIG. 8 is a block diagram of a computer system that may be used in conjunction with embodiments of the present invention.
Figure 9:
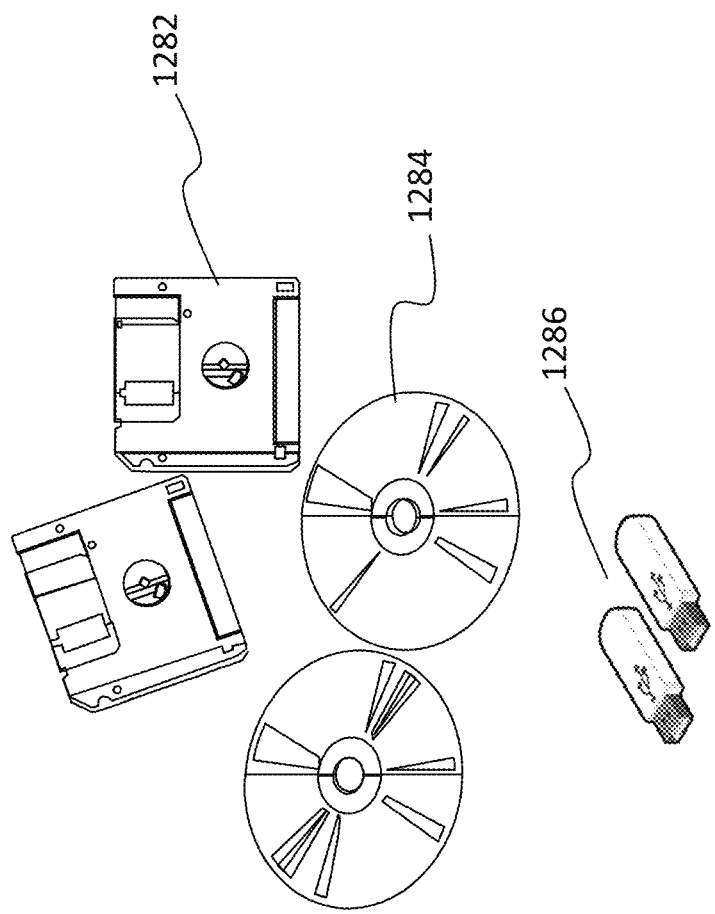
FIG. 9 is a depiction of some forms of non-volatile storage media.

FIG. 1A is a flowchart depicting a method for computing predictions using a hybrid ensemble learning system according to embodiments of the present invention and the interactions of the hybrid ensemble learning system with a user and human participants (human predictors). As shown in FIG. 1A, a hybrid ensemble learning system 100 receives a forecasting question 112 from an end-user 150. In various embodiments of the present invention, the hybrid ensemble learning system 100 is implemented in executable computer code running on one or more computer systems 1200, as shown in FIG. 8 or stored on non-transitory computer readable media, as shown in FIG. 9. The computer code according to embodiments of the present invention configures the computer systems 1200 to be special purpose machines that implement the particular operations in accordance with hybrid ensemble learning systems according to embodiments of the present invention.

Human predictors 220 provide inputs 124 to the hybrid ensemble learning system 100 at various portions of the machine learning or model training pipeline 160. In some embodiments, these human inputs 124 relate to tasks that are relatively simple or tractable for people or subject matter experts to perform, but which may be difficult or highly inefficient for machines to perform automatically, such as identifying valuable data sources, identifying outliers and high-information regions in the data, and tuning model parameters.

In more detail, as shown in FIG. 1A, the machine learning pipeline 160 may first parse the forecasting question 112 at 202 in order to obtain a determine one or more topics associated with the question. The machine learning pipeline 160 may then include selecting and scraping 162 data sources relevant to the forecasting question 112 in accordance with the topics detected during the parsing 202 of the question 112, selecting 164 portions of the data relevant to the forecasting question 112, and determining 166 model parameters for the training 168 of machine learning models.

The models are then used to compute 170 a plurality of forecasts (or predictions) which are aggregated 172 to compute a single forecast (or single prediction). The aggregation of the different forecasts may be performed in accordance with weights that are (later) computed or adjusted 174 based on differences between the forecasts and the actual results from the data sources. In some circumstances, the single forecast is compared 176 against a threshold value to determine whether to generate 178 an alert (e.g., an email, a text message, a notification on a computing device, or a phone call) to be sent to a user, such as, but not limited to, the user 150 who originally posed the forecasting question 112.

In some embodiments, the systems and methods described herein may be used as a component of, or in conjunction with, a human-aided machine forecasting module 120 of a human-machine hybrid forecasting system (shown in FIG. 1B), as described in more detail in U.S. Provisional Patent Application No. 62/804,016 and U.S. Provisional Patent Application No. 62/815,304, the entire disclosures of which are incorporated by reference herein. In particular, the feedback provided by the human participants 220 with regard to the machine learning pipeline 160 may form a part of the human teaching signal 124.

Figure 1B:
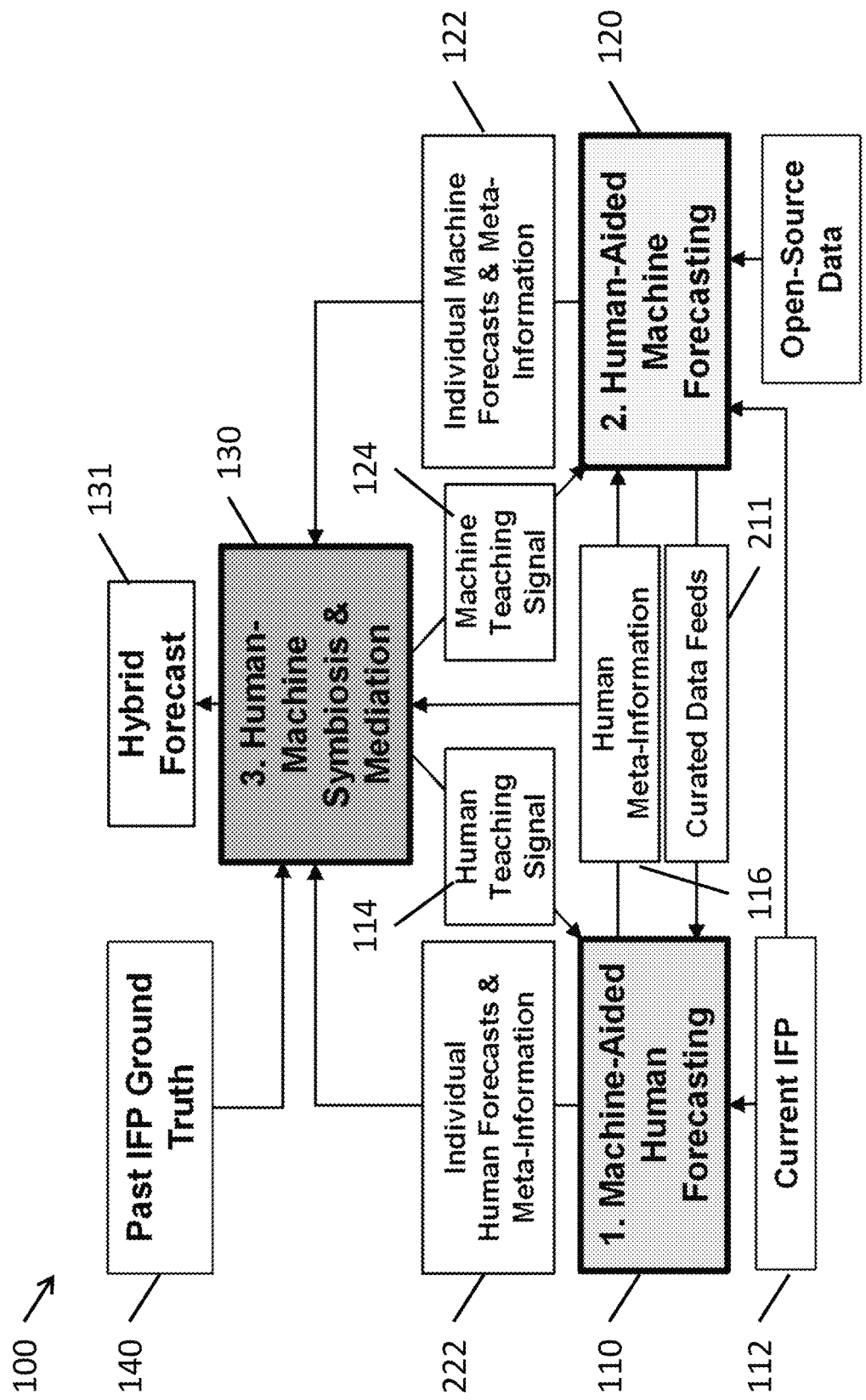
FIG. 1B is a system block diagram of a hybrid forecasting system that is used with a human-machine hybrid ensemble learning system according to one embodiment of the present invention.
Figure 1C:
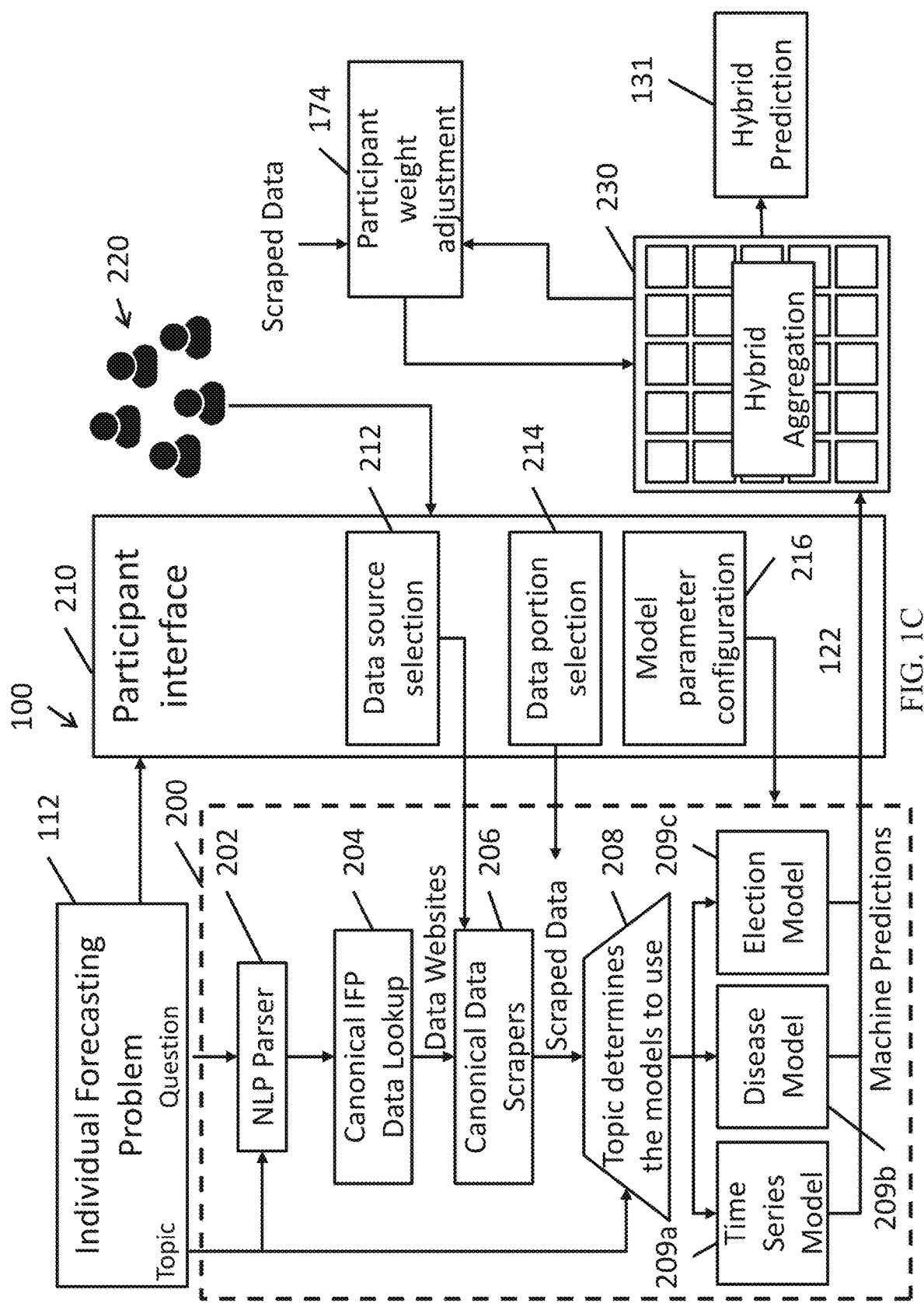
FIG. 1C is a schematic diagram depicting the flow of information through a hybrid forecasting system according to one embodiment of the present invention.

FIG. 1B is a system block diagram of a hybrid forecasting system that is used with a human-machine hybrid ensemble learning system according to one embodiment of the present invention. FIG. 1C is a schematic diagram depicting the flow of information through a hybrid forecasting system that is used with a human-machine hybrid ensemble learning system according to one embodiment of the present invention. A hybrid forecasting system will be described in more detail according to three different aspects, as shown in FIGS. 1B and 1C. One aspect, referred to as "machine-aided human forecasting" (MAHF) 110, is that machines can help humans to become better forecasters by reducing bias and mitigating fatigue. Another aspect, referred to as "human-aided machine forecasting" (HAMF) 120, which may be enabled and improved in accordance with embodiments of the present invention, is that human judgments may be leveraged to make forecasting algorithms and machine learning more efficient by identifying model drift and providing feedback to the machine models by viewing the outputs of the machine models, curating data supplied to the machine models, and the like. A third aspect, referred to as "human-machine symbiosis and mediation" (HMS) 130, is that the behaviors of the human forecasters and the machine forecasters can be combined in order to make better overall forecasts 131. Each of these strategies occupies a module in the hybrid ensemble learning system 100 that receives information from the other modules and from outside sources, processes it, and then passes relevant information to the other modules. This flow of information between modules allows the human participants and machines to improve each other through information and learning. Past IFP Ground Truth 140 includes the answers to previously asked questions, which are used to compute accuracy and train the system by adjusting weights, as described in more detail below.

Referring to FIGS. 1B and 1C, a forecasting question or individual forecasting problem (IFP) 112 is presented to the hybrid ensemble learning system 100. The IFP 112 may take the form of a natural language question, such as "What will be the price of gold on Jul. 20, 2025?" presented as text (e.g., typed in using a computer keyboard or the text output of a speech-to-text engine). As shown in FIG. 1B, the current IFP 112 may be supplied to both the machine-aided human forecasting (MAHF) module 110 and the human-aided machine forecasting (HAMF) module 120. In more detail, as shown in FIG. 1C, a machine forecasting module 200 (which may be a component of the HAMF module 120) first parses the forecasting question text using a natural language processing (NLP) parser 202 (e.g., the spaCy natural language processing library from ExplosionAI GmbH of Berlin, Germany), where the NLP parser 202 extracts relevant variables (e.g., named entities, nouns, and a forecast date, if relevant) and classifies the question as belonging to one of several canonical categories using the Canonical IFP Data Lookup module 204. In some embodiments of the present invention, the categories (or "topics") include: politics, economics, natural sciences, and health/disease. Table 1, below, shows examples of question templates and the topics associated with each of these question templates.

TABLE 1

Example template questions and topics associated with the question templates

| Topic | Question Template |
|---|---|
| Politics | Will the UN Security Council adopt a resolution concerning [country/region] between [time period]? |
| Economics | What will be the daily closing price of gold on [date] in USD? |
| Economics | What will be the daily price of oil (USD per barrel) on [date], according to the U.S. EIA? |
| Natural Sciences | How many earthquakes of magnitude [x] or stronger will occur worldwide in [month]? |
| Cyber Security | How many 'hacking or malware (HACK)' data breaches will Privacy Rights Clearinghouse record in [month]? |
| Economics | How much crude oil will [country] produce in [month]? |
| Economics | What will be the FAO [Cereal/Vegetable/Dairy/Sugar Price Index] in [month]? |
| Politics | What will be the approval rating for the Russian government in [month]? |
| Economics | What will be the short-term interest rate for [country (country code)] in [month]? |
| Economics | What will be the monthly Period-over-Period change in the consumer price index (CPI) for [country] in [month]? |
| Politics | Will FEWS NET publish a Food Security Alert with "famine" and "[country]" in its headline between [date and date]? |
| Economics | What will be the long-term interest rate for [country (country code)] in [month]? |
| Economics | What will be the [currency] to one US Dollar daily exchange rate on [date]? |
| Economics | What will be the daily closing price of [stock market index] on [date]? |
| Politics | Will ACLED record any riot/protest events in [country] in [month]? |
| Natural Sciences | What will be the [minimum/maximum] extent of sea ice on [body of water] in [year]? |
| Health/ Disease | How many positive influenza virus detections will FluNet record for [country] between [date] and [date]? |
| Health/ Disease | How many cases of MERS-CoV in humans will EMPRES-I record in Saudi Arabia between [date] and [date]? |
| Health/ Disease | Will the WHO confirm more than [x] cases of Marburg in [year]? |
| Health/ Disease | How many cases of Zika will occur in [country] between [date] and [date]? |

In some embodiments, a general time series model 209a may be used to make predictions for which there is time series data available. In some embodiments, there are specific models for predicting disease 209b, elections 209c, and civil unrest, as well as a generic time series prediction model that covers forecasting questions where there is ample time-series data, and an appropriate model is chosen based on the category assigned by the NLP Parses 202. For example, if the keywords include terms that are semantically related to the spread of disease (or other concepts, such as the spread of memes, that are well modeled by a disease model), then the disease model 209b may be selected. As another example, if the keywords include terms that relate to elections or voting, then the election model 209c may be selected. In the event that none of the specialized models is selected, then a standard time series model 209a may be selected.

Selecting and Scraping Sources

In operation 162 of the machine learning pipeline 160, Canonical Data Scrapers 206 scrape data from a variety of data sources (e.g., sources on the internet) and store the data on the data cluster (e.g., persistent network storage devices) on a regular basis. In module 208, the canonical category and forecasting problem variables determine (based on the keywords and/or the scraped data) which machine forecasting method is triggered and retrieves the appropriate input data for that method, such as checking a lookup table (mapping topics to data sources) for a topic closest to the topic of the forecasting problem.

In practice, in some circumstances, the process of determining relevant sets of input data is sensitive to the particular nouns and named entities extracted from the question. For example, minor changes in wording can cause the natural language processor to misclassify the topic of an individual forecasting problem. In addition, if the question structure or topic is not known beforehand, then the system may not be able to determine, automatically, what data sources will be relevant to the forecasting question. Therefore, some aspects of embodiments of the present invention relate to human participants 220 providing feedback 124 through a data source selection module 212 of the participant interface 210 by providing new data for the machine algorithms to process and by making judgments about how suitable a given set of data is for a given problem based on its appearance in the participant interface 210; and relevance and veracity of the source, as determined by the individual human participant 220. As shown in FIG. 1B, the feedback 124 may include a human teaching signal 124A and a machine teaching signal 124B.

As noted above, in some circumstances, a forecasting system is not equipped to automatically extract, download, and parse the most relevant data to solve a particular forecasting task. Even when the system is able to download some data, other sources might remain unknown or unreachable by the system (e.g., not among the data sources stored in the memory of the hybrid ensemble learning system). Accordingly, in some embodiments of the present invention, the participant interface 210 allows human participants 220 to supply data that they may find from other sources (e.g., searches on general purpose search engines, etc.). In various embodiments of the present invention, these external data are formatted for ingestion by the system as time series data in machine readable formats such as: comma-separated value (csv) or tab-separated value (tsv) files, spreadsheet files (e.g., Microsoft® Excel® spreadsheets) that contain one-to-one or one-to-many correlated time and value information that relates a given signal or signals to specific moments in time. In some embodiments, after the files are uploaded into the system through the participant interface 210, the data contained therein are displayed through the participant interface 210. After uploading, other participants in the crowd have the ability to look at the new data, make judgments about it, and incorporate it into their own forecasts.

Figure 2:
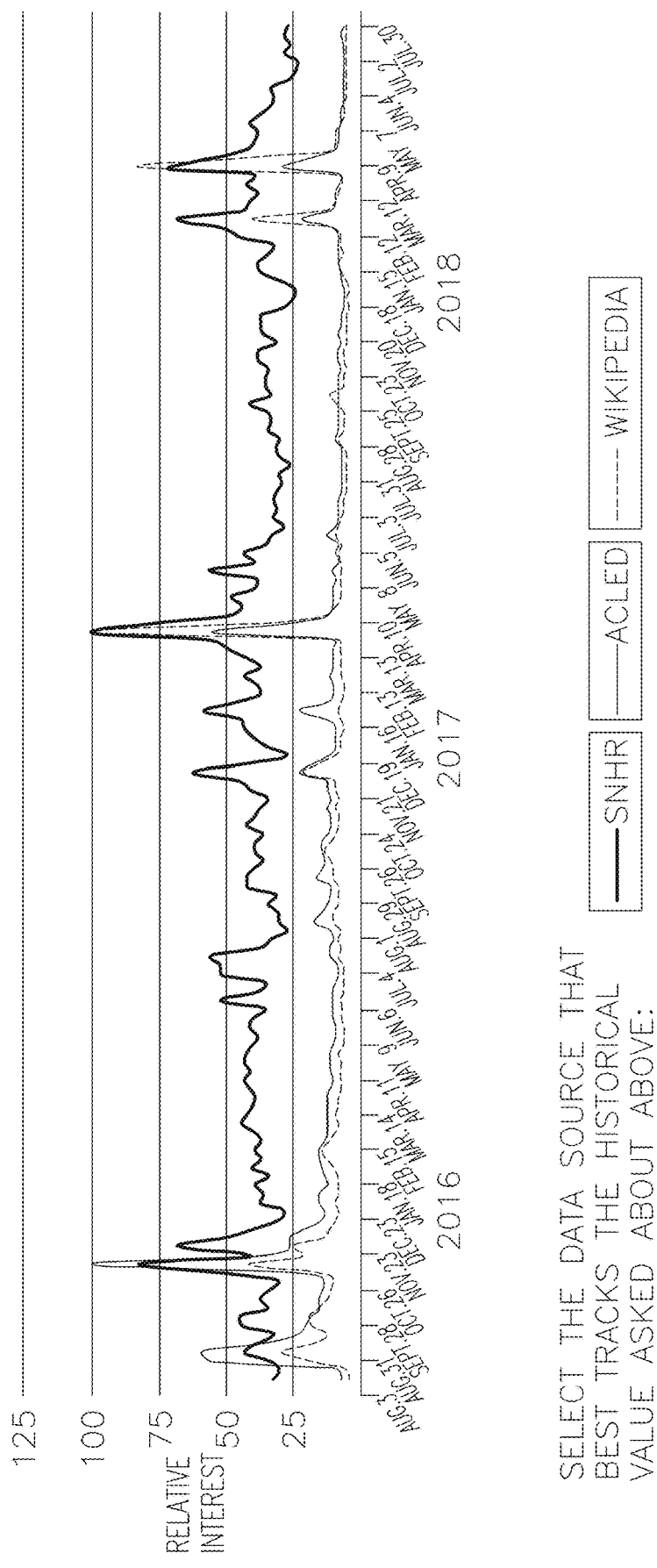
FIG. 2 is a depiction of a user interface according to one embodiment of the present invention for selecting relevant data sources for a particular individual forecasting problem.

In some aspects of embodiments of the present invention, the human participants 220 may also supply judgments about the data in the system (e.g., both the data automatically extracted from online sources by the system and the data provided by the human participants 220). In some embodiments, the participant interface 210 displays the time series information for each data source along with the name of the source and prompts the human participant 220 to indicate which of the data sources are applicable for the given forecasting problem. FIG. 2 is a depiction of a user interface according to one embodiment of the present invention for selecting relevant data sources for a particular individual forecasting problem. In the example shown in FIG. 2, the individual forecasting problem (IFP) posed is "What will be the number of civilians killed in Syria in August 2018, according to the Syrian Network for Human Rights (SNHR)?" and the human participant 220 is asked to select a data source that best tracks the IFP from a group of different data sources. The data from each of the data sources is shown on the same graph, but with different color or shading. In the example shown in FIG. 2, the three line graphs are shown of historical data from the Syrian Network for Human Rights (SNHR), the Armed Conflict Location and Event Data Project (ACLED), and Wikipedia, showing the values reported by each of the data sources from August 2016 through July 2018.

At this stage, the human participant 220 may use the data source selection module 212 of the participant interface 210 to "select" or "deselect" different data sources based on their own personal criteria. For example, a human participant may eliminate a given data source based on the reputation of the source or because the signal is especially noisy or poorly-conditioned. In addition, as noted above, in some embodiments of the present invention, a human participant 220 may supply (e.g., upload) additional data from other sources that may not previously have been available to the prediction system. The data provided by the human participant 220 may then be displayed on the graph with the other data sources.

In some embodiments of the present invention, the human participants 220 select or deselect data sources by clicking on the legends corresponding to the data sets. The data source selection module 212 of the participant interface 210 may also include a "continue" button to confirm the human participant's selection of data sources once the human participant 220 is satisfied that the selected data sources are relevant and that the irrelevant or unreliable sources have been deselected. The hybrid ensemble learning system 100 stores the participant's selections for the current IFP 112 for later use and evaluation (e.g., in a database stored on a non-volatile mass storage device).

Accordingly, embodiments of the present invention integrate human participant review and selection of the data that the machine prediction algorithms will use, thereby enabling human subject matter experts to remove or reduce the impact of inaccurate, irrelevant, or generally bad data when computing machine predictions. In contrast, in comparative systems this judgment call may be available only to the machine learning specialist who can choose from among a set of already known data sources or may only be available to subject matter experts who also have skills in areas such as data science and/or machine learning.

Selecting Portions of Data

Following the selection and scraping of data in operation 162, the machine learning pipeline 160 of the hybrid ensemble learning system 100 filters the data points for outliers and relevant historical window by selecting a portion of the data in operation 164.

In time-series forecasting, it is often the case that outliers and older historical data can skew the accuracy of time-series forecasting models such as Bayesian Structural Time-Series (BSTS) or disease models or election models. Some aspects of the present invention relate to using a human forecaster's abilities of causal reasoning and of performing research outside of the platform (such as performing searches on a general purpose internet search engine) to provide assistance 124 to the automated methods for this operation, such as by editing existing data sets and supplying additional data sets. For example, in estimating the stock price of the DAX index over the next few months, humans may be able to incorporate knowledge about trade tariffs or other economic policies enacted over time that would significantly change the value of this quantity. In these cases, the human predictor may believe that discarding data before the policy was enacted is a reasonable way to exclude irrelevant or uncharacteristic data from a model during training. One automated method for doing so would be to discard outliers greater than two standard deviations from the mean and historical data that is more than three years old.

Embodiments of the present invention allow human participants 220 to edit outlier points and window training data resulting in many sets of training data corresponding to the input from individual human participants 220 using a data portion selection module 214 of the participant interface 210. The selection of training data constitutes task 2 of the human inputs outlined below.

In more detail, in operation 164, the hybrid ensemble learning system 100 further refines the data from the data sources selected in operation 162 based on human participant 220 selections of portions of that data that are particularly relevant to the forecasting question to allow the models to make better machine predictions. According to various embodiments of the present invention, this is done in two different ways: training window editing and outlier removal. In some embodiments of the present invention, the editing is performed entirely by the human participants 220 (e.g., via the data portion selection module 214 of the participant interface 210).

Figure 3:
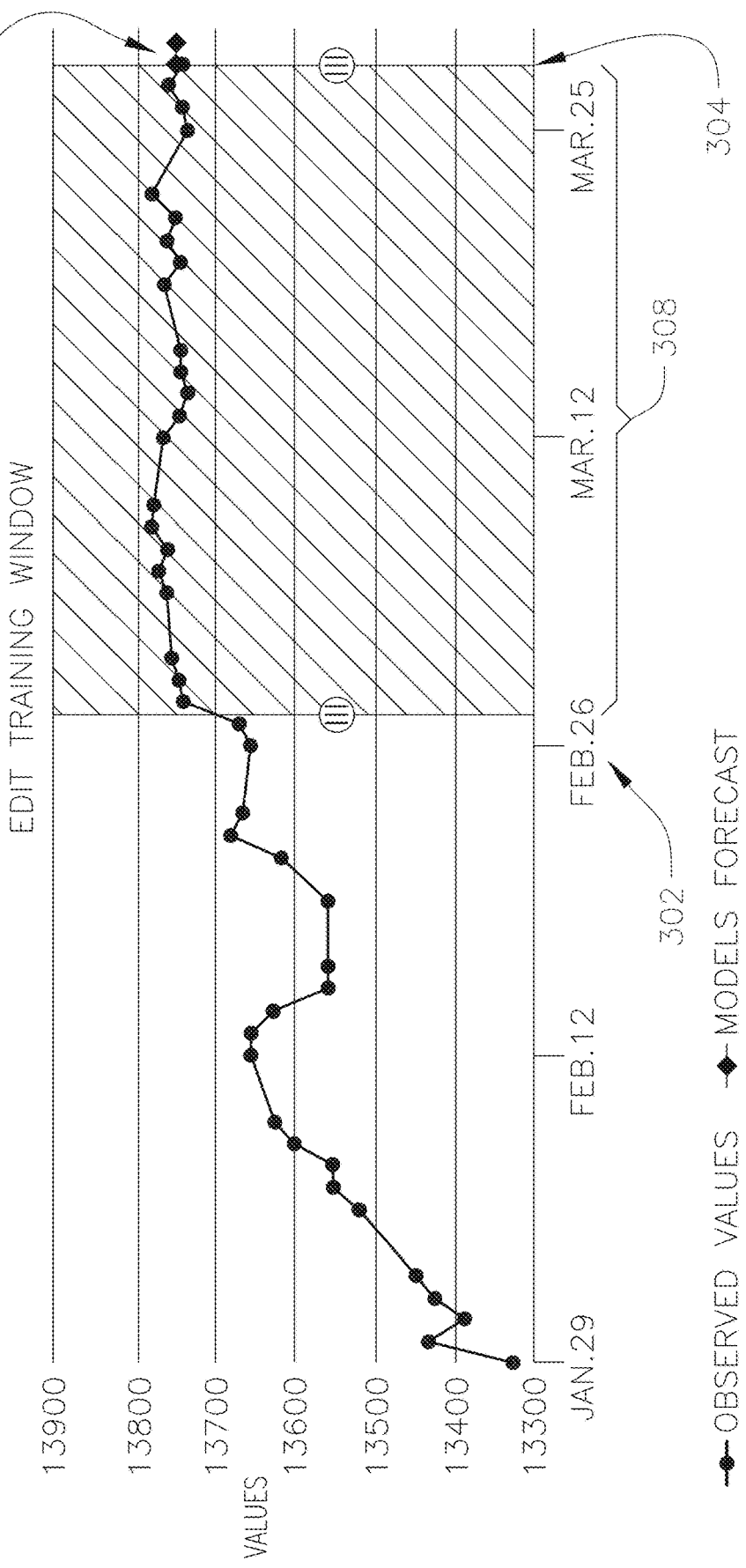
FIG. 3 is a depiction of a user interface according to one embodiment of the present invention for receiving a user selection (a "training window") of a portion of a set of input data.

FIG. 3 is a depiction of a user interface according to one embodiment of the present invention for receiving a user selection (a "training window") of a portion of a set of input data. According to some embodiments, the training window includes a start date (or start timestamp) and an end date (or end timestamp), and identifies the selection of the data points from the start date until the end date. As shown in FIG. 3, the data portion selection module 214 of the participant interface 210 provides a user interface for a human participant 220 to select the beginning and end points 302 and 304 (e.g., start date and end date) of a portion of the data to be used to train the machine predictors. In some embodiments, the user interface further displays the values forecast 306 by a currently selected machine model when trained based on the currently selected training window 308 of the data. For example, if the current machine model was a linear regression, then a linear regression would be computed based on the selected portion of the data and the values predicted by the linear regression model for the upcoming time periods are displayed on the user interface. In some embodiments of the present invention, the model forecast is updated in real-time based on the current training window.

The length and position of the training window to use for a given problem depends on many factors, such as the importance of recent data versus old data. In addition to being able to set a window of data for the machine predictor to use, the human participant 220 may also apply a "forgetting factor" to the window, in which older data points are given less weight than recent data points when training the machine predictors (the mathematical models).

In some embodiments of the present invention, the machine forecasting module performs editing automatically based on training from prior input 124 by human participants 220 regarding the selection of relevant portions of the data. In some embodiments, the machine forecasting module 200 includes a training window predictor which provides assistance in the selection of portions of the data by presenting suggestions (computed based on prior suggestions by the human participants 220) to the user via the data portion selection module 214 of the participant interface 210. According to some embodiments of the present invention, the system configures the training window predictor by determining which participants are good at selecting training data windows, where the performance of the participants is determined from the final forecasting accuracy improvement from their choices. The system extracts features of the training windows selected by the high-performing participants, where the features may include, for example, the variance of the data within the window, the recency of the windowed data (perhaps older data is not as relevant for a particular data source), and the like. These features are then used to automatically edit future training data, e.g., to automatically suggest training windows having similar features.

Some aspects of embodiments of the present invention relate to removing outlier data points from data sets. Examples of data points that can be safely removed are those that appear to be in clear violation of a trend and that can be otherwise explained by an unusual external event. For example, if a small-scale natural disaster (e.g., an earthquake) caused a sudden and temporary increase in oil prices, the machine predictor may produce more accurate results if the data points corresponding to the event were removed from the data set for the purposes of predicting the oil price over the long-term. On the other hand, if events that cause outliers are predictable or occur frequently or periodically, then they may be retained in the data set. Determine whether outlier data points should be removed generally involves judgment from subject matter experts who can evaluate whether particular events cause merely temporary effects that can be ignored or long term effects that should be included. Accordingly, in some embodiments of the present invention, the human predictors 220 use the data portion selection module 214 of the participant interface 210 to remove data points from a given time series.

Figure 4A:
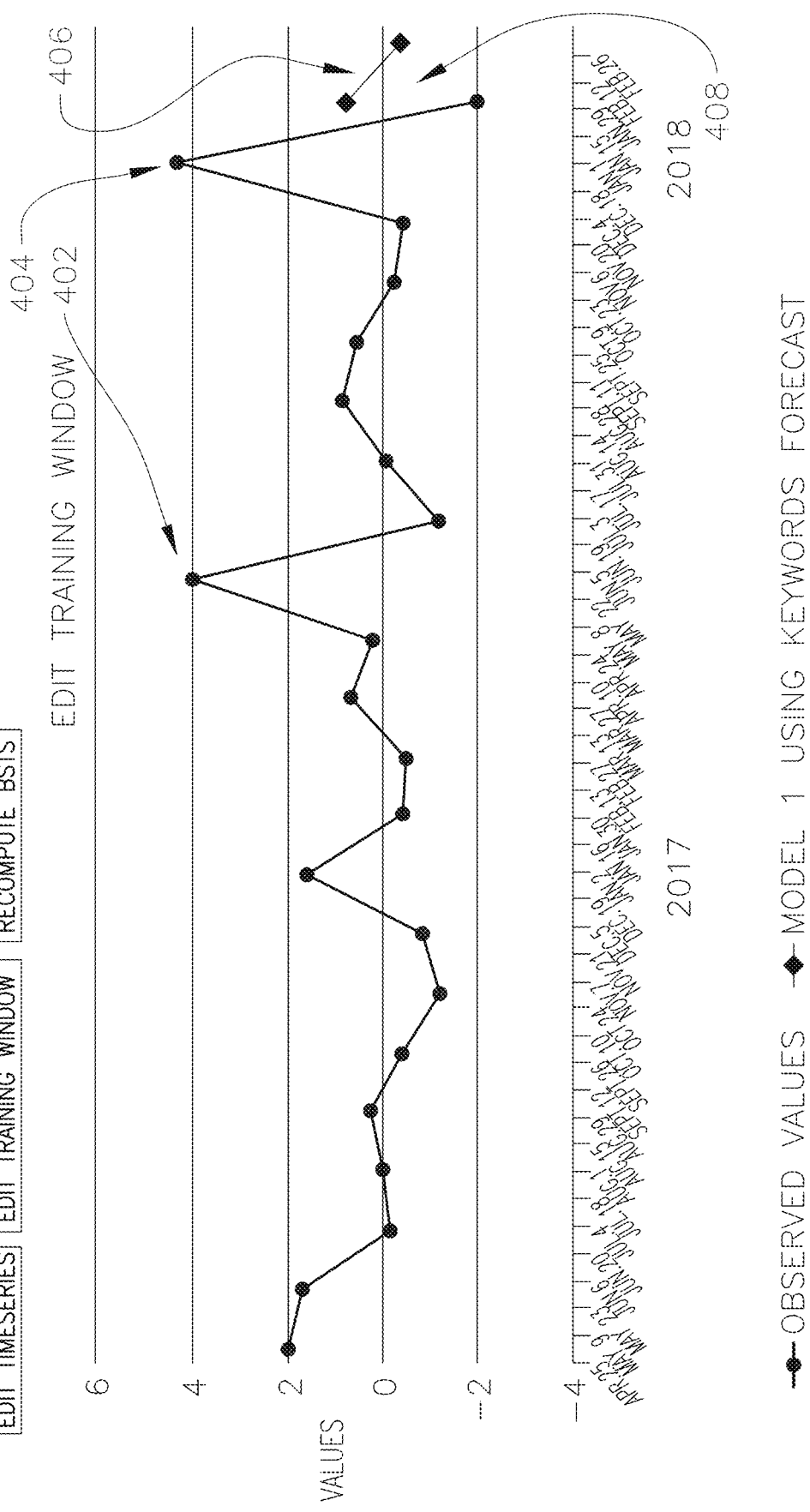
FIG. 4A is a depiction of a user interface according to one embodiment of the present invention depicting time series data containing potential outlier points.

FIG. 4A is a depiction of a user interface according to one embodiment of the present invention depicting time series data containing potential outlier points. The data shown in FIG. 4A includes two points 402 and 404 that a human participant may recognize as being outliers, in part because the two outlier points have values near 4, whereas all of the other values in the data set fall between −2 and 2. FIG. 4A also shows two forecasted points or predicted points 406 at values of about 1 and 0, as forecast by "Model1" based on all of the points in the data set, including the outlier points 402 and 404. In this case, the outliers 402 and 404 in the time series have caused the machine model to produce a prediction that has a sudden jump in value compared to the latest data point in the set, along with a discontinuity 408.

A human participant 220 reviewing the data may research the outliers and determine whether the two outliers 402 and 404 can be removed based on external, temporary events. If a human participant 220 determines that these outliers are irrelevant to the requested forecast, then the human participant 220 can use the data portion selection module 214 of the participant interface 210 to remove those outlier points 402 and 404 from the data set. FIG. 4B is a depiction of a user interface according to one embodiment of the present invention depicting time series data with outliers removed. FIG. 4B also shows updated forecasted points or predicted points 406' computed by the machine model based on the data set with the outlier points removed. As shown in FIG. 4B, the updated forecasted points are more in-line with the latest values of the data set.

As noted above, in some embodiments of the present invention, the hybrid ensemble learning system 100 includes a training window predictor that is trained to predict which portions of the data set a user would select for the training window. Similarly, in some embodiments of the present invention, the hybrid ensemble learning system 100 includes an outlier predictor that is trained to predict which data values a human subject matter expert would remove. In some embodiments of the present invention, the system configures the outlier predictor by setting a threshold on the distance from the mean or center of a distribution (e.g., three standard deviations). Points which lie outside this distance are called "outliers." In some embodiments, this threshold for automatically labeling outliers is determined based on outlier labels from high-performing human participants (e.g., human participants that provide outlier labels that improved the accuracy of the system, as judged by the ground truth results stored in Past IFP Ground Truth module 140). In more detail, in some embodiments, points labeled by high-performing humans as outliners are measured in terms of their distance from the mean of the distribution in multiples of the standard deviation of the distribution. The distances of these points from the mean of the distribution (in units of the standard deviations of their respective distributions) are then aggregated, such as by computing a mean or other average of these distances, to compute a threshold value for the outlier predictor.

Determining Model Parameters

After selecting particular portions of the data sets to supply to the prediction models in operation 164, the hybrid ensemble learning system 100 determines, in operation 166, model parameters for configuring the machine predictors or "models." Some aspects of embodiments of the present invention relate to receiving input 124 from the human participants 220 regarding the model parameters and the weights of the models when computing the aggregated single forecast in operation 172.

In some embodiments of the present invention, human participants 220 can provide values for the tunable parameters for each machine predictor using the model parameter configuration module 216 of the participant interface 210. (In circumstances where a human participant 220 does not provide parameters for a particular machine predictor, a collection of default values or values set by other human participants 220, or an aggregate thereof, may be used.) In some embodiments, the model parameter configuration module 216 displays a list of parameter names and editable numeric fields in the participant interface 210. As the human participant 220 adjusts the model parameters for a given model (or machine predictor), the machine forecasting module 200 of the ensemble learning system 100 recalculates the model prediction and updates the participant interface 210 with the updated prediction so that the human participant can build an understanding of the influence of a given parameter on the model (e.g., the influence of the parameter on the predictions made by the model). Each machine predictor will have its own collection of tuning parameters and the user may switch between models seamlessly. In addition, different human participants 220 may supply their own collections of parameters for each model.

As one example, in embodiments of the present invention in which the machine models include a Bayesian Structural Time-Series (BSTS) machine model, the parameters may include model parameters relating to the trend and seasonality of the data and the amount of uncertainty assumed in future forecasts (e.g., size of the confidence bounds). In some embodiments, these parameters correspond to an "AddSeasonal" parameter (e.g., the human participant can specify the number of seasons within a time period, e.g. day, month, year), and toggling between "AddLocalLinearTrend" vs. "AddSemiLocalLinearTrend" (e.g., where the human participant can specify a higher uncertainty model for longer term forecasts). These represent a limited set of possible function calls in the BSTS R package (see, e.g., Scott, S. L., & Varian, H. R. (2013). Bayesian variable selection for nowcasting economic time series (No. w19567). National Bureau of Economic Research.), and additional embodiments of the present invention implement additional model parameters, where the model parameter configuration module 216 of the participant interface 210 displays the model parameters in a manner that is easy for subject matter experts (e.g., non-specialists in the underlying mathematical models) to understand. The participant interface 210 for selection of model parameters is almost exactly the same as the user interface (UI) shown in FIG. 3, with the exception that the "Edit Time-series" and "Edit Training Window" buttons are replaced by buttons which add seasonal components and reduce uncertainty of the forecast as described above.

Embodiments of the present invention are not limited to the use of BSTS—other time-series prediction models may be used in conjunction with or instead of the BSTS model, such as autoregressive integrated moving average (ARIMA), simple time-averaging, exponential smoothing, Holt's linear trend method, or the Holt-Winters method (as non-limiting examples of potential time-series predictors—any or all of which might be used in a given embodiment of the system). Like BSTS, these other prediction models may also be configured in accordance with a collection of parameters.

Accordingly, some aspects of embodiments of the present invention allow human participants to observe the impact of changing the model parameters and to provide input on the model parameters.

Figure 5:
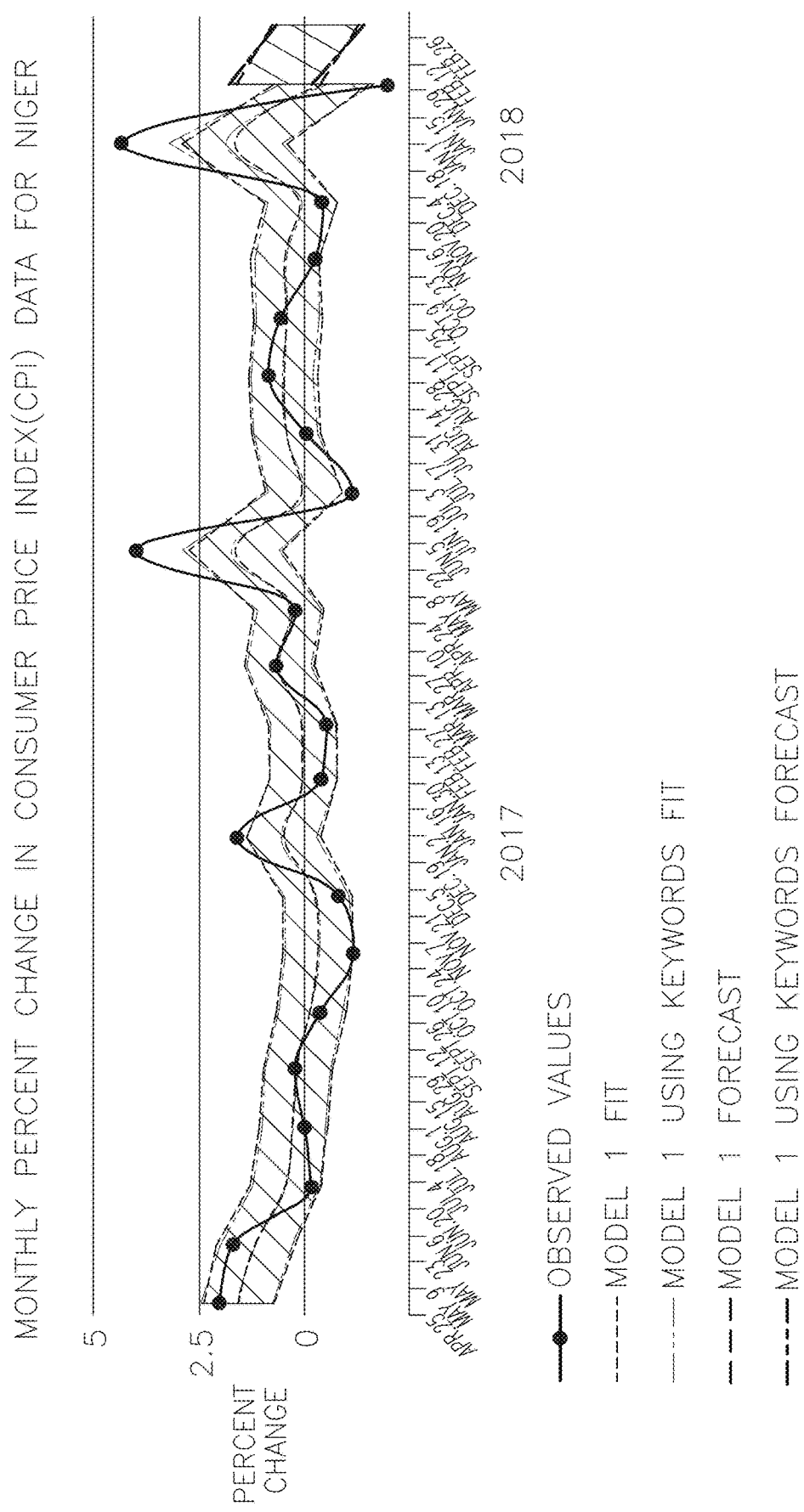
FIG. 5 is a depiction of a user interface according to one embodiment of the present invention displaying the results predicted by various machine models configured with different parameters in comparison to actual observed values.

FIG. 5 is a depiction of a user interface according to one embodiment of the present invention displaying the results predicted by various machine models in comparison to actual observed values. As shown in FIG. 5, the various models predict different values with different error bands.

Figure 6:
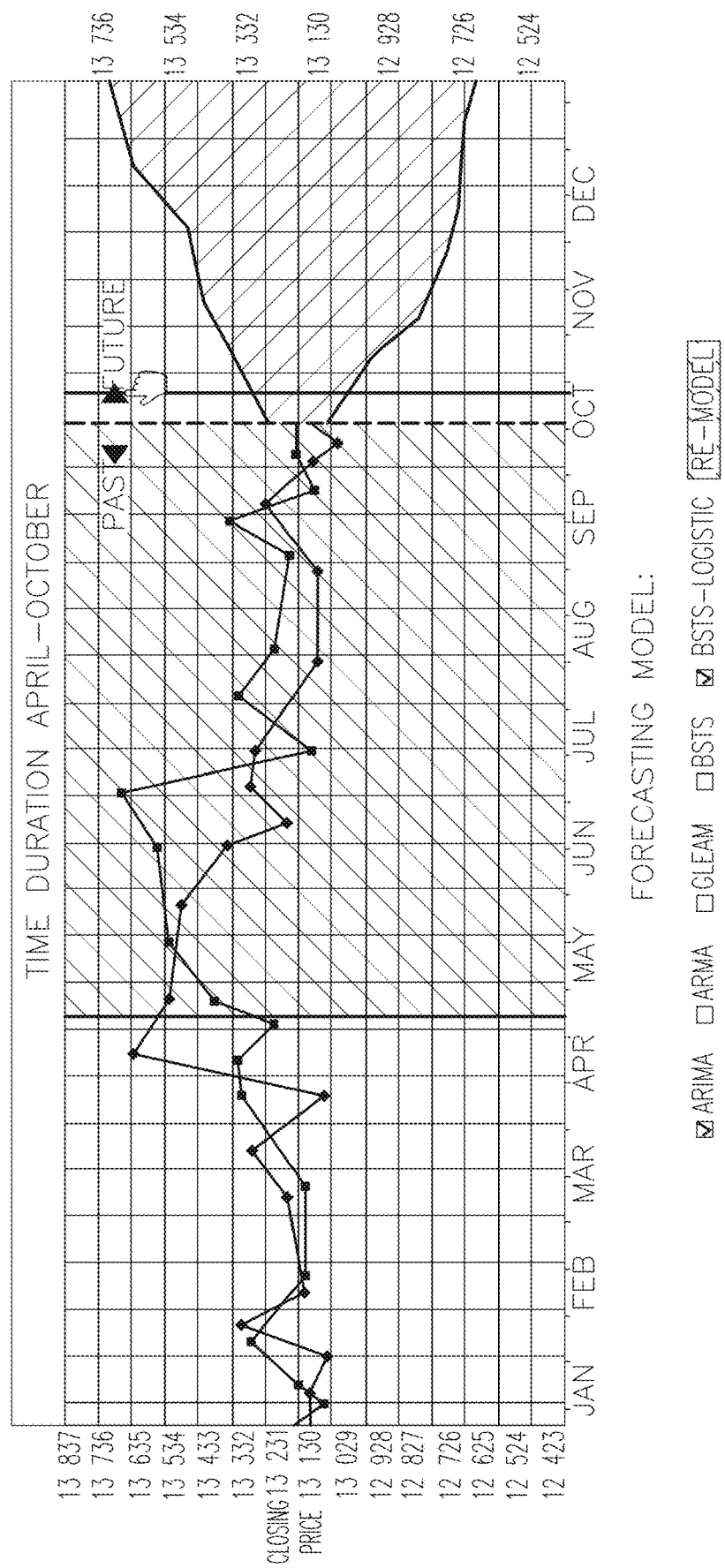
FIG. 6 is a depiction of a user interface according to one embodiment of the present invention for assigning weights to the various forecasting models.

Once a human predictor has configured the model parameters for the various models, the models are trained, in operation 168, based on the portions of the data selected in operation 164, and the trained models are used to compute forecasts in operation 170. The output forecasts of the various models may then be combined or aggregated into a final prediction in operation 172. When more than one machine learning or time-series modeling predictor algorithm is in use, the hybrid ensemble learning system 100 aggregates the individual forecasts or predictions from the separate models when producing the final system output prediction in operation 172. In some embodiments of the present invention, each of the models is associated with a corresponding model weight, and the forecast corresponds to a weighted combination of the individual forecasts. In some embodiments, each individual human predictor performs this task independently from the other human predictors and the hybrid ensemble learning system 100 automatically performs the aggregation step 172 to produce a single system prediction. FIG. 6 is a depiction of a user interface according to one embodiment of the present invention for assigning weights to the various forecasting models.

As shown in FIG. 6, the human participant 220 has the ability to view the data in a graph along with outputs from different machine predictors on the graph. The human participant can also toggle the individual machine models off and on; as the models are activated and deactivated, the prediction cone updates in real-time (see right-hand portion of FIG. 6). In addition to turning different forecasting models on and off, the model parameter configuration module 216 of the participant interface 210 also receives human participant input to adjust the weights of the individual machine predictors. By using the model parameter configuration module 216, the human participant can select a set of forecasting models and assign weights to those models such that the system makes a "reasonable" forecast, at which point the model parameters, model selections, and weights data are recorded by the system.

Accordingly, the machine forecast or machine predictions 122 and input data are displayed on a participant interface 210 (e.g., a user-facing website) as an information source (or curated data feeds 211) for the human forecasters 220 to provide guidance 124 through modules of the participant interface 210, including a data source selection module 212, a data portion selection module 214, and a model parameter configuration module 216, which correspond to portions of the machine learning pipeline 160 including selecting and scraping 162 data sources relevant to the forecasting question 112, selecting 164 portions of the data relevant to the forecasting question 112, and determining 166 model parameters for the training 168 of machine learning models.

Accordingly, human participants 220 can train the ensemble aggregation methods to perform better predictions by manually adjusting the model and ensemble weights until the calculated system forecast reflects what the human participant 220 finds to be a reasonable forecast (e.g., a forecast that is explainable by the supplied data and consistent with data that is not used in the prediction). The model parameters, model selections, and weights that are supplied by the human participants 220 are used by the system to compute the aggregate ensemble in operation 172, as discussed below.

Ensemble Aggregation

In operation 172, the hybrid ensemble learning system 100 aggregates the individual inputs from the human participants 220 into a single forecast representing the system's prediction in response to the individual forecasting problem or forecasting question 112. In some embodiments of the present invention, this forecast is computed based on weights (e.g., included in the human meta-information 116 shown in FIG. 1B) that are adjusted in operation 174 (described in more detail below) and that are applied to each input from each of the human participants 220, where the weights are adjusted as the forecasting questions are resolved against the ground truth (the actual outcome of the forecasting question, e.g., when the IFP is "What will be the price of gold on Jul. 20, 2025?" the "ground truth" will be the actual price of gold on Jul. 20, 2025 as stored and computed by the Past IFP Ground Truth module 140). In some embodiments, the weights associated with each of the human participants 220 are adjusted based on whether the inputs provided by those human participants caused the prediction models to generate predictions that turned out to be correct (e.g., where the predicted values were close to the ground truth values).

Accordingly, human participant 220 input 124 to systems according to embodiments of the present invention provides a basis for the variation of the different elements of the aggregate ensemble of forecasts. While each time-series prediction algorithm (or trained prediction model) can provide a single input to the predictive ensemble, each of the human participants 220 can interact with and edit each of these prediction algorithms, linearly increasing the number of inputs to the predictive ensemble. The embodiments described above include three ways in which human participants 220 can provide input to the hybrid ensemble learning system 100: by providing historical data sources (task 1 in operation 162), by pruning training data observations or selecting portions of the data (task 2 in operation 164), and setting model parameters (task 3 in operation 166). For a system with N human participants, D data sources, and P machine predictors, the human-machine hybrid ensemble may have up to N×D×P individual inputs, as opposed to merely P predictors in a machine-only predictive system (assuming a single data source). The diversity of inputs as enabled by a human population provides robustness to the system predictions and demonstrates the strength of this invention.

The various machine forecasts or machine predictions 122 are stored to be used in the hybrid aggregation module 230, which aggregates the machine predictions 122 in accordance with weights associated with the participants 220 to compute the hybrid prediction 131.

According to some embodiments of the present invention, each human participant i of the human participants 220 is represented by a set of scalar weights $\{w_i^1, w_i^2, w_i^3\}$ which represent the credibility of the i-th human participant with respect to task 1, task 2, and task 3. The hybrid ensemble learning system 100 computes these weights in operation 174 by determining the marginal impact of their task result on the final forecast accuracy once ground truth is known (after the forecasting problem resolves), as determined by the Past IFP Ground Truth module 140.

Figure 7:
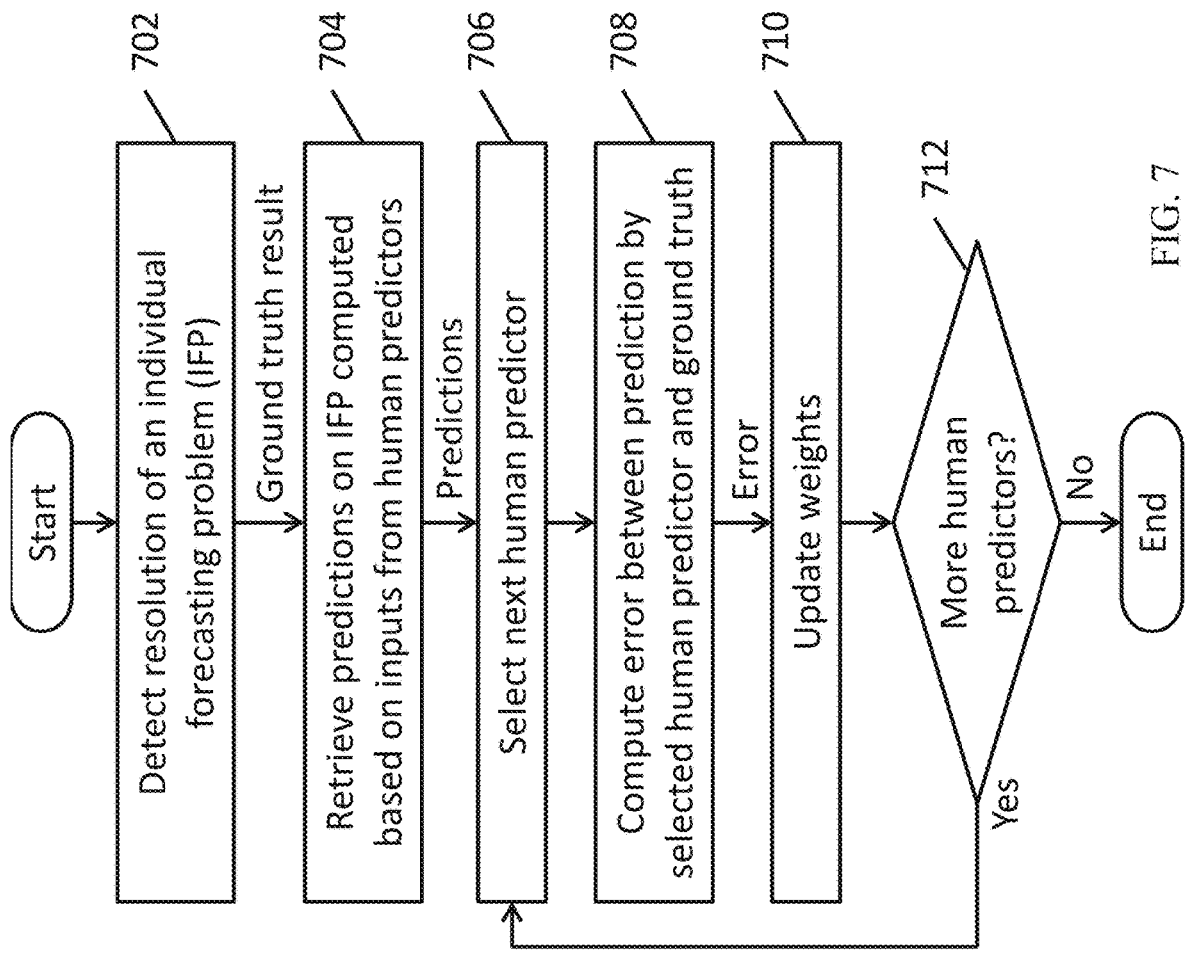
FIG. 7 is a flowchart of a method according to one embodiment of the present invention for updating the sets of weights of the human participants.

FIG. 7 is a flowchart of a method according to one embodiment of the present invention for updating the sets of weights of the human participants. In more detail, as discussed above, human participants 220 provide inputs to configure the machine learning pipeline 160 for making a prediction on a particular individual forecasting problem (IFP) 112, where the inputs supplied by each human participant 220 (e.g., the selection of data sources, the selection of training windows and removal of outliers, and the setting of model parameters) are used to generate a forecast prediction specific to that particular human participant, such that there is a plurality of different forecasts (e.g., the output of operation 170 in FIG. 1). After time passes and the particular date associated with the forecast has arrived, the ground truth value is known. Accordingly, in operation 702, the hybrid ensemble learning system 100 detects the resolution of an individual forecasting question (e.g., detects that the forecast date has arrived and retrieves the ground truth value associated with the forecast date from the Past IFP Ground Truth module 140, such as, continuing the example above, when Jul. 20, 2025 has arrived the price of gold on that date). In operation 704, the hybrid ensemble learning system 100 retrieves the forecasts or predictions on the IFP made by the models based on the inputs provided by the human predictors (e.g., by loading stored predictions from a database or by re-computing the predictions based on the inputs originally supplied by the human forecasters). In operation 706, the hybrid ensemble learning system 100 selects a next human predictor from among the human predictors who supplied inputs for addressing the current IFP. In operation 708, the prediction made by the currently selected human predictor and the ground truth value are compared to compute an error value (e.g., an absolute difference between the ground truth value and the predicted value or a squared difference between the ground truth value and the predicted value). In operation the hybrid ensemble learning system 100 updates the weights 710 based on the computed error, e.g., by increasing one or more of the weights associated with the selected human predictor when the error is small and decreasing one or more weights associated with the selected human predictor when the error is large. In operation 712, the hybrid ensemble learning system 100 determines if there are more human predictors who provided input on the current IFP. If so, then the process returns to operation 706 to select the next human predictor. If not, then the process for updating weights ends.

In some embodiments of the present invention, the weights associated with the participants are computed and updated in operation 174 using a multiplicative weights algorithm, although embodiments of the present invention are not limited thereto. According to one embodiment, let t=1, 2, 3 be the task number (e.g., corresponding to providing historical data sources (task 1 in operation 162), pruning training data observations or selecting portions of the data (task 2 in operation 164), and setting model parameters (task 3 in operation 166)). Task 2 depends on task 1 before it, and task 3 depends on both task 2 and task 1. The final accuracy of a set of inputs from a human participant in tasks 1, 2, and 3 can be measured by comparing the final model forecast F with the realized or ground truth value which answers the forecasting question of interest. Let i=1, 2, . . . N be the index for an individual human participant. The weight assignment and updating proceeds as outlined in Algorithm 1 below and depicted in FIG. 8, which is a flowchart of a method according to one embodiment of the present invention for updating the sets of weights of the human participants in accordance with the multiplicative weights algorithm.

Algorithm 1:

Initialization: fix an $\eta \leq \frac{1}{2}$. For each human participant task response $x_i^t$, associate the weight $w_i^t[0]=1$.

For m=1, 2, . . . , M, where m is a time index indicating a time when a forecast answer is revealed:

1. For t=1, 2, 3, compute:

$$\hat{x}^t = A^t(w_1^t, w_2^t, \ldots, w_N^t, x_1^t, x_2^t, \ldots, x_N^t) \text{ and}$$

$$\hat{x}_{-i}^t = A^t(w_1^t, \ldots, w_{i-1}^t, w_{i+1}^t, \ldots, w_N^t, x_1^t, \ldots, x_{i-1}^t, x_{i+1}^t, \ldots, x_N^t)$$

2. Compute forecasts:

$$F(\hat{x}^1, \hat{x}^2, \hat{x}^3),$$

$$F_{-i}^1(\hat{x}_{-i}^1, \hat{x}^2, \hat{x}^3),$$

$$F_{-i}^2(\hat{x}^1, \hat{x}_{-i}^2, \hat{x}^3),$$

$$F_{-i}^3(\hat{x}^1, \hat{x}^2, \hat{x}_{-i}^3,)$$

3. Observe the marginal cost $c_i^t[m]=B(F_{-i}^t)-B(F)$ where B(F) is the Brier score resulting from forecast F 4. Penalize the bad participant input by updating their task-specific weights:

For i=1, 2, . . . , N set $w_i^t[m+1]=w_i^t[m](1-\eta)^{c_i^t[m]}$ where $x_i^t$ is the current response of human participant i to task t. In some embodiments, for data source selections in task 1, a response $x_i^1$ includes a collection of binary decisions on whether or not each data source is relevant. In some embodiments, for pruning observations in task 2, each response $x_i^2$ includes a collection of binary vectors corresponding to the different data sets selected in task 1, where each binary vector is a number of observations in length, identifying which training data points to keep for a corresponding one of the data sets. In some embodiments, for model parameter estimation in task 3, each response $x_i^3$ may include a collection of vectors of model parameters, where each vector corresponds to parameters to one of the machine models. The weight updating algorithm does not require all N participants to provide responses to each task. The time index m, above, is based on discrete events, because updates to weights occur when only forecasting problems reach their forecast date.

The function $A^t$ aggregates all the user input per task. Some aspects of embodiments of the present invention relate to determining the operations performed by $A^t$ to provide the highest accuracy for a given context. According to one embodiment, the $A^t$ function performs a single probabilistic draw from a multinomial distribution corresponding to the learned weight vector per task $w^t$, which constitutes a type of "no-regret learning" (see, e.g., Roughgarden, T. (2016). "No-Regret Dynamics" in Twenty lectures on algorithmic game theory 230-246. Cambridge University Press, the entire disclosure of which is incorporated by reference herein). According to one embodiment of the present invention, $A^t$ implements a weighted average of user responses, where the weights correspond to the credibility weights learned by Algorithm 1. The forecast $F_{-i}^2$ (for example) is the forecast obtained by aggregating all inputs except for the one belonging to human participant i's input for task 2. Therefore the marginal cost of inclusion is based on the Brier score (lower indicates higher accuracy) with and without that particular input.

While one embodiment of the present invention described above uses the aforementioned multiplicative weights algorithm to determine how the individual inputs to the ensemble are weighted in order to compute the output of the hybrid ensemble learning system (e.g., a single prediction based on an ensemble of separate predictions), embodiments of the present invention are not limited thereto and may aggregate an ensemble of predictions using different techniques. For example, the algorithm used to create the final aggregation of inputs may be a machine learning or artificial intelligence algorithm that is configured to learn a series of weights based on a set of inputs and a ground truth, which is learned through the realization of predicted events and correction of the weights over time. As a specific example, in some embodiments of the present invention, a system of artificial neural networks is configured to adjust the skill weights of the individual users to integrate their inputs into the ensemble and to generate a single forecast of the hybrid ensemble learning system 100.

After human input is elicited for the three stages of the machine learning pipeline described above (select and scrape data sources 162, select portions of data 164 and determine model parameters 166), a single aggregate forecast is constructed in operation 172 based on the trained models, where the forecasts made by those trained models are weighted based on the sets of weights associated with the human participants who supplied the inputs for training those respective models.

In operation 176, the hybrid ensemble learning system 100 compares the single aggregate forecast to a threshold value (e.g., predetermined threshold value). This value normally corresponds to two standard deviations above or below the current value. If the aggregate hybrid forecast value exceeds the higher bound or falls below the lower bound, an electronic alert is generated in operation 178, e.g., in the form of an email or cell phone notification sent to the end-user 150.

Accordingly, aspects of embodiments of the present invention provide systems and methods for integrating input from human participants, such as subject matter experts, to select and edit the data sources provided to machine models and to configure parameters of the machine models to improve the accuracy of the predictions made by the machine models in accordance with the human inputs. Aspects of embodiments of the present invention also relate to aggregating the multiple machine models configured by the human participants to compute a single prediction based on the multiple machine models in accordance with weights assigned to the human participants. Some aspects of embodiments of the present invention relate to assigning and updating the weights to the human participants based on past performance of the models configured by the human participants. As such, embodiments of the present invention improve the field of predictive modeling by making the editing of data and the configuration of the machine models easily accessible to subject matter experts, who may otherwise lack the data manipulation skills of a machine learning specialist, artificial intelligence specialist, or data scientist.

Computer Systems

An exemplary computer system 1200 in accordance with an embodiment is shown in FIG. 8. Computer systems similar to those described herein may be used, for example, to implement the model training system described above, and/or trained models in pre-deployment and in deployment, but embodiments of the present invention are not limited thereto. The exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of the exemplary computer system 1200. When executed, the instructions cause the exemplary computer system 1200 to perform specific actions and exhibit specific behavior, such as described herein.

The exemplary computer system 1200 may include an address/data bus 1210 that is configured to communicate information. Additionally, one or more data processing units, such as a processor 1220, are coupled with the address/data bus 1210. The processor 1220 is configured to process information and instructions. In an embodiment, the processor 1220 is a microprocessor. Alternatively, the processor 1220 may be a different type of processor, such as a parallel processor or a field programmable gate array.

The exemplary computer system 1200 is configured to utilize one or more data storage units. The exemplary computer system 1200 may include a volatile memory unit 1230 (e.g., random access memory ("RAM"), static RAM, dynamic RAM, etc.) coupled with the address/data bus 1210, wherein the volatile memory unit 1230 is configured to store information and instructions for the processor 1220. The exemplary computer system 1200 further may include a non-volatile memory unit 1240 (e.g., read-only memory ("ROM"), programmable ROM ("PROM"), erasable programmable ROM ("EPROM"), electrically erasable programmable ROM ("EEPROM"), flash memory, etc.) coupled with the address/data bus 1210, wherein the non-volatile memory unit 1240 is configured to store static information and instructions for the processor 1220. Alternatively, the exemplary computer system 1200 may execute instructions retrieved from an online data storage unit, such as in "cloud" computing. In an embodiment, the exemplary computer system 1200 also may include one or more interfaces, such as an interface 1250, coupled with the address/data bus 1210. The one or more interfaces are configured to enable the exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, the exemplary computer system 1200 may include an input device 1260 coupled with the address/data bus 1210, wherein the input device 1260 is configured to communicate information and command selections to the processor 1220. In accordance with one embodiment, the input device 1260 is an alphanumeric input device, such as a keyboard, that may include alphanumeric and/or function keys. Alternatively, the input device 1260 may be an input device other than an alphanumeric input device. In an embodiment, the exemplary computer system 1200 may include a cursor control device 1270 coupled with the address/data bus 1210, wherein the cursor control device 1270 is configured to communicate user input information and/or command selections to the processor 1220. In an embodiment, the cursor control device 1270 is implemented utilizing a device such as a mouse, a track-ball, a track-pad, an optical tracking device, or a touchscreen. The foregoing notwithstanding, in an embodiment, the cursor control device 1270 is directed and/or activated via input from the input device 1260, such as in response to the use of special keys and key sequence commands associated with the input device 1260. In an alternative embodiment, the cursor control device 1270 is configured to be directed or guided by voice commands.

In an embodiment, the exemplary computer system 1200 further may include one or more optional computer usable data storage devices, such as a storage device 1280, coupled with the address/data bus 1210. The storage device 1280 is configured to store information and/or computer executable instructions. In one embodiment, as shown in FIG. 9, the storage device 1280 is a storage device such as a magnetic or optical disk drive (e.g., hard disk drive ("HDD"), floppy diskette 1282, compact disc read-only memory ("CD-ROM") 1284, digital versatile disc ("DVD")), or flash memory (e.g., NAND flash in the form of a USB drive) 1286. Pursuant to one embodiment, a display device 1290 is coupled with the address/data bus 1210, wherein the display device 1290 is configured to display video and/or graphics. In an embodiment, the display device 1290 may include a cathode ray tube ("CRT"), liquid crystal display ("LCD"), field emission display ("FED"), plasma display, or any other display device suitable for displaying video and/or graphic images and alphanumeric characters recognizable to a user.

The exemplary computer system 1200 is presented herein as an exemplary computing environment in accordance with an embodiment. However, the exemplary computer system 1200 is not strictly limited to being a computer system. For example, an embodiment provides that the exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented utilizing computer-executable instructions, such as program modules, being executed by a computer. In one exemplary implementation, such program modules include routines, programs, objects, components, and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for computing a human-machine hybrid ensemble prediction comprises:
   receiving, by a computer system comprising a processor and memory, an individual forecasting question;
   parsing, by the computer system, the individual forecasting question to classify the individual forecasting question into a canonical question topic from among a plurality of canonical question topics;
   identifying, by the computer system, one or more machine models associated with the canonical question topic;
   for each of the machine models:
      receiving, from one or more human participants of a plurality of human participants:
         a first task input comprising a selection of one or more sets of training data;
         a second task input comprising one or more selections of portions of the selected sets of training data for training the machine model; and
         a third task input comprising a collection of model parameters to configure the machine model;
      training the machine model in accordance with the first task input, the second task input, and the third task input; and
      computing a machine model forecast based on the trained machine model;
   computing, by the computer system, an aggregated forecast from a plurality of machine model forecasts computed by the one or more machine models in accordance with a plurality of weights associated with the human participants, the weights associated with each human participant being computed based on past performance of machine models configured by the human participant; and
   sending, by the computer system, an alert in response to determining that the aggregated forecast satisfies a threshold condition.

2. The method of claim 1, further comprising:
   displaying the machine model forecast to the human participant;
   re-computing the machine model forecast in response to:
      the selection of the one or more sets of training data of the first task input;

the selection of the one or more portions of the selected sets of training data of the second task input; or the collection of model parameters of the third task input; and updating the machine model forecast displayed to the human participant in accordance with the re-computed machine model forecast.

3. The method of claim 1, wherein the first task input comprises the selection of a data set from a plurality of sets of training data stored in the memory of the computer system.

4. The method of claim 1, wherein the first task input comprises uploading a data set to the memory of the computer system from a source unknown to the computer system.

5. The method of claim 1, wherein the second task input comprises the selection of a training window comprising data points from a start date until an end date.

6. The method of claim 1, wherein the second task input comprises a selection of outlier data points for removal.

7. The method of claim 1, wherein the one or more machine models comprise a Bayesian Structural Time-Series model.

8. The method of claim 1, wherein each of the human participants is associated with:
a first weight representing credibility of the human participant on the first task input;
a second weight representing credibility of the human participant on the second task input; and
a third weight representing credibility of the human participant on the third task input.

9. The method of claim 8, further comprising updating the weights associated with the human participants by:
detecting resolution of the individual forecasting question as a ground truth;
retrieving the machine model forecasts computed based on the trained machine models trained in accordance with the first task input, the second task input, and the third task input from the human participants; and
for each human participant of the human participants:
computing an error between the ground truth and the machine model forecast associated with the human participant;
in response to determining that the error is small, increasing one or more weights associated with the human participant; and
in response to determining that the error is large, decreasing one or more weights associated with the human participant.

10. The method of claim 8, further comprising updating the weights associated with the human participants in accordance with a multiplicative weights algorithm.

11. A hybrid ensemble learning system for computing a human-machine ensemble prediction, the hybrid ensemble learning system comprising:
a processor; and
memory storing instructions that, when executed by the processor, cause the processor to:
receive an individual forecasting question;
parse the individual forecasting question to classify the individual forecasting question into a canonical question topic from among a plurality of canonical question topics;
identify one or more machine models associated with the canonical question topic;
for each of the machine models:
receive, from one or more human participants of a plurality of human participants:
a first task input comprising a selection of one or more sets of training data;
a second task input comprising one or more selections of portions of the selected sets of training data for training the machine model; and
a third task input comprising a collection of model parameters to configure the machine model;
train the machine model in accordance with the first task input, the second task input, and the third task input; and
compute a machine model forecast based on the trained machine model;
compute an aggregated forecast from a plurality of machine model forecasts computed by the one or more machine models in accordance with a plurality of weights associated with the human participants, the weights associated with each human participant being computed based on past performance of machine models configured by the human participant; and
send an alert in response to determining that the aggregated forecast satisfies a threshold condition.

12. The hybrid ensemble learning system of claim 11, wherein the memory further stores instructions that, when executed by the processor, cause the processor to:
display the machine model forecast to the human participant;
re-compute the machine model forecast in response to:
the selection of the one or more sets of training data of the first task input;
the selection of the one or more portions of the selected sets of training data of the second task input; or
the collection of model parameters of the third task input; and
update the machine model forecast displayed to the human participant in accordance with the re-computed machine model forecast.

13. The hybrid ensemble learning system of claim 11, wherein the first task input comprises the selection of a data set from a plurality of sets of training data stored in the memory of the hybrid ensemble learning system.

14. The hybrid ensemble learning system of claim 11, wherein the first task input comprises uploading a data set to the memory of the hybrid ensemble learning system from a source unknown to the hybrid ensemble learning system.

15. The hybrid ensemble learning system of claim 11, wherein the second task input comprises the selection of a training window comprising data points from a start date until an end date.

16. The hybrid ensemble learning system of claim 11, wherein the second task input comprises a selection of outlier data points for removal.

17. The hybrid ensemble learning system of claim 11, wherein the one or more machine models comprise a Bayesian Structural Time-Series model.

18. The hybrid ensemble learning system of claim 11, wherein each of the human participants is associated with:
a first weight representing credibility of the human participant on the first task input;
a second weight representing credibility of the human participant on the second task input; and
a third weight representing credibility of the human participant on the third task input.

19. The hybrid ensemble learning system of claim 18, wherein the memory further stores instructions that, when executed by the processor, cause the processor to update the weights associated with the human participants by:
  detecting resolution of the individual forecasting question as a ground truth;
  retrieving the machine model forecasts computed based on the trained machine models trained in accordance with the first task input, the second task input, and the third task input from the human participants; and
  for each human participant of the human participants:
    computing an error between the ground truth and the machine model forecast associated with the human participant;
    in response to determining that the error is small, increasing one or more weights associated with the human participant; and
    in response to determining that the error is large, decreasing one or more weights associated with the human participant.

20. The hybrid ensemble learning system of claim 18, wherein the memory further stores instructions that, when executed by the processor, cause the processor to update the weights associated with the human participants in accordance with a multiplicative weights algorithm.

21. A non-transitory computer readable medium having instructions stored thereon that, when executed by a computer system comprising a processor and memory, configure the computer system to:
  receive an individual forecasting question;
  parse the individual forecasting question to classify the individual forecasting question into a canonical question topic from among a plurality of canonical question topics;
  identify one or more machine models associated with the canonical question topic;
  for each of the machine models:
    receive, from one or more human participants of a plurality of human participants:
      a first task input comprising a selection of one or more sets of training data;
      a second task input comprising one or more selections of portions of the selected sets of training data for training the machine model;
      a third task input comprising a collection of model parameters to configure the machine model;
    train the machine model in accordance with the first task input, the second task input, and the third task input; and
    compute a machine model forecast based on the trained machine model;
  compute an aggregated forecast from a plurality of machine model forecasts computed by the one or more machine models in accordance with a plurality of weights associated with the human participants, the weights associated with each human participant being computed based on past performance of machine models configured by the human participant;
  send an alert in response to determining that the aggregated forecast satisfies a threshold condition.

22. The non-transitory computer readable medium of claim 21, further storing instructions that, when executed by the computer system, configure the computer system to:
  display the machine model forecast to the human participant;
  re-compute the machine model forecast in response to:
    the selection of the one or more sets of training data of the first task input;
    the selection of the one or more portions of the selected sets of training data of the second task input; or
    the collection of model parameters of the third task input; and
  update the machine model forecast displayed to the human participant in accordance with the re-computed machine model forecast.

23. The non-transitory computer readable medium of claim 21, wherein the first task input comprises the selection of a data set from a plurality of sets of training data stored in the memory of the computer system.

24. The non-transitory computer readable medium of claim 21, wherein the first task input comprises uploading a data set to the memory of the computer system from a source unknown to the computer system.

25. The non-transitory computer readable medium of claim 21, wherein the second task input comprises the selection of a training window comprising data points from a start date until an end date.

26. The non-transitory computer readable medium of claim 21, wherein the second task input comprises a selection of outlier data points for removal.

27. The non-transitory computer readable medium of claim 21, wherein the one or more machine models comprise a Bayesian Structural Time-Series model.

28. The non-transitory computer readable medium of claim 21, wherein each of the human participants is associated with:
  a first weight representing credibility of the human participant on the first task input;
  a second weight representing credibility of the human participant on the second task input; and
  a third weight representing credibility of the human participant on the third task input.

29. The non-transitory computer readable medium of claim 28, further storing instructions that, when executed by the computer system, cause the computer system to update the weights associated with the human participants by:
  detecting resolution of the individual forecasting question as a ground truth;
  retrieving the machine model forecasts computed based on the trained machine models trained in accordance with the first task input, the second task input, and the third task input from the human participants; and
  for each human participant of the human participants:
    computing an error between the ground truth and the machine model forecast associated with the human participant;
    in response to determining that the error is small, increasing one or more weights associated with the human participant; and
    in response to determining that the error is large, decreasing one or more weights associated with the human participant.

30. The non-transitory computer readable medium of claim 28, further storing instructions that, when executed by the computer system, cause the computer system to update the weights associated with the human participants in accordance with a multiplicative weights algorithm.

* * * * *